Figure 1:
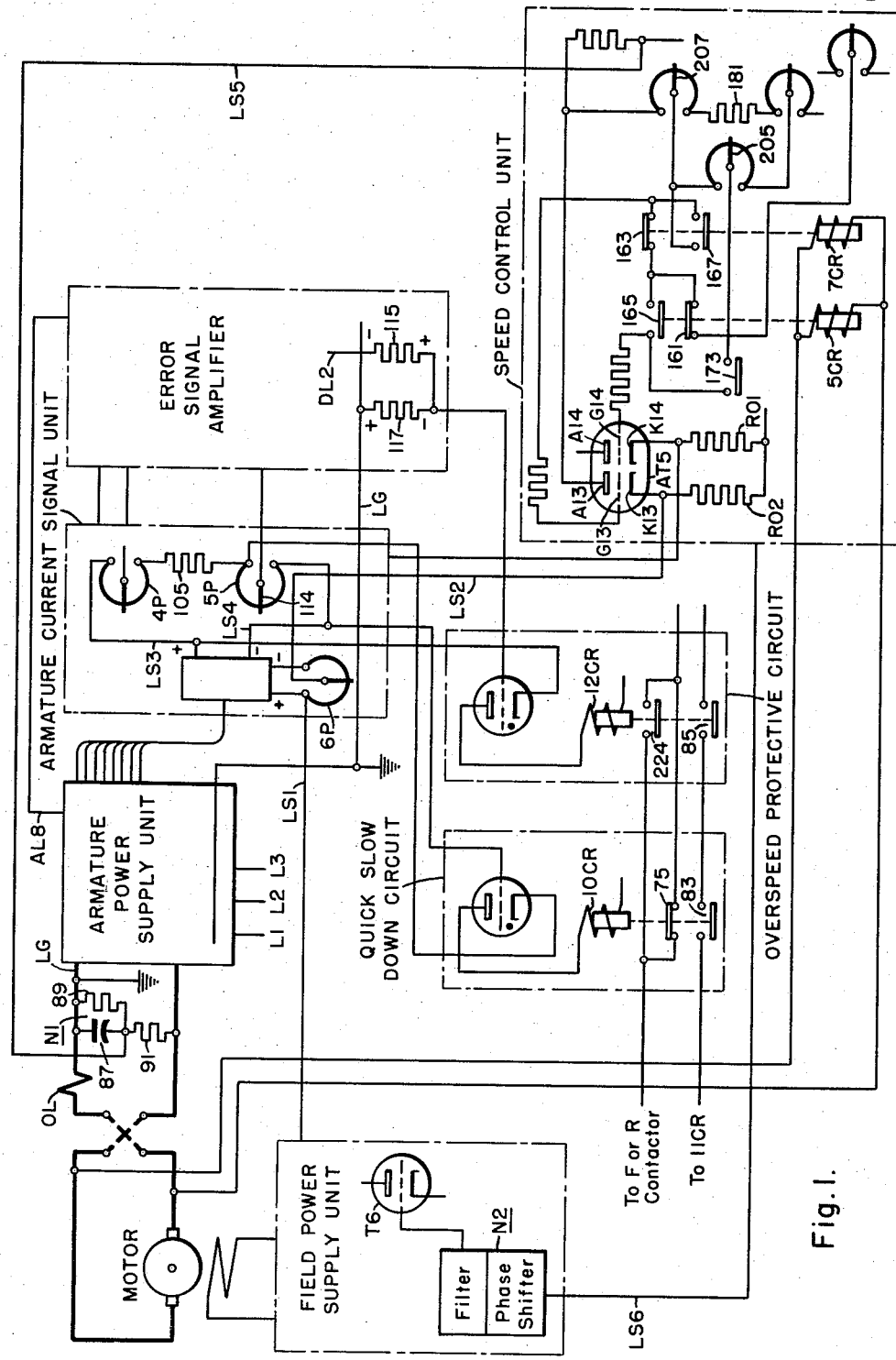
Figure 2A:
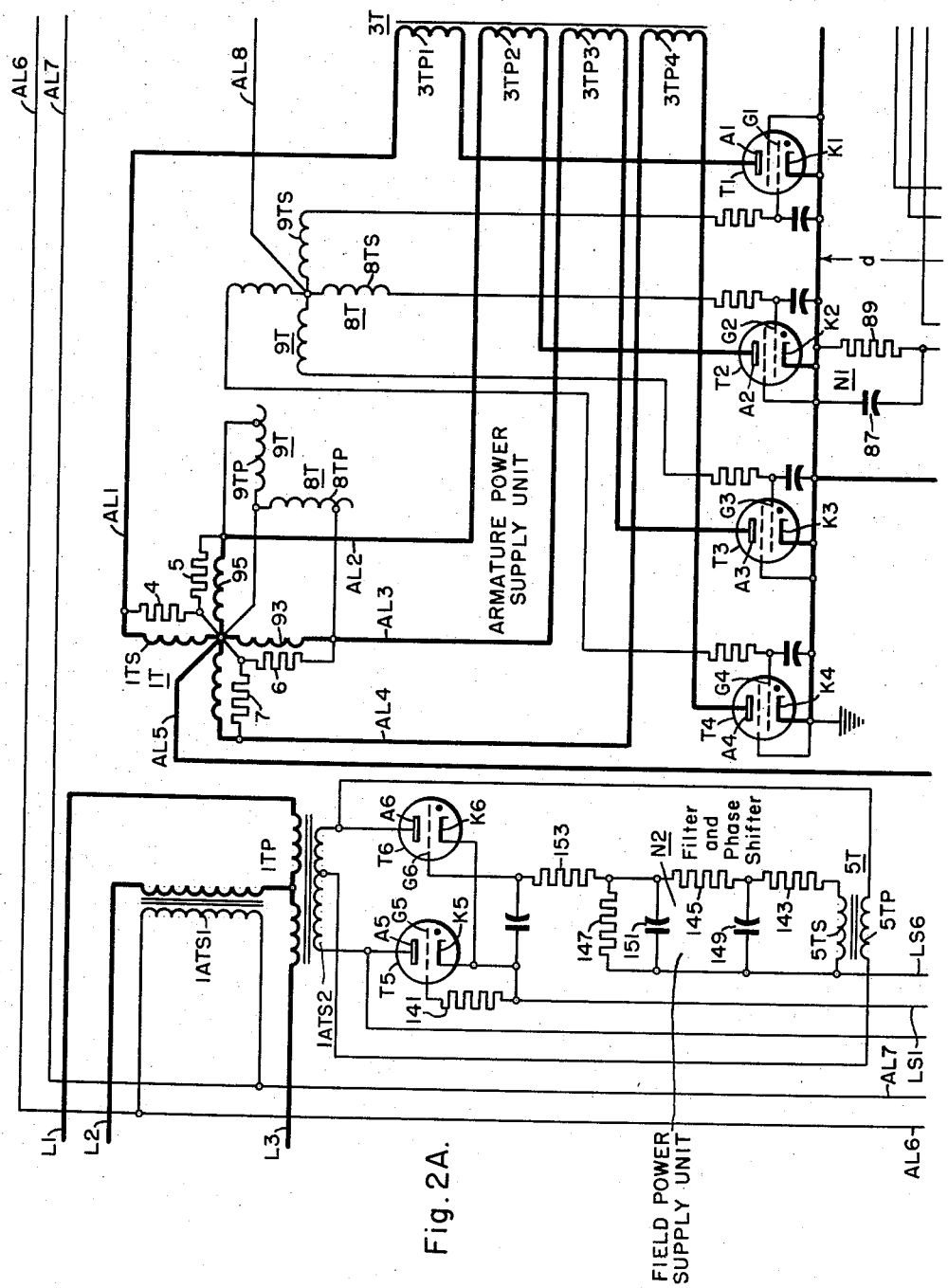
Figure 2B:
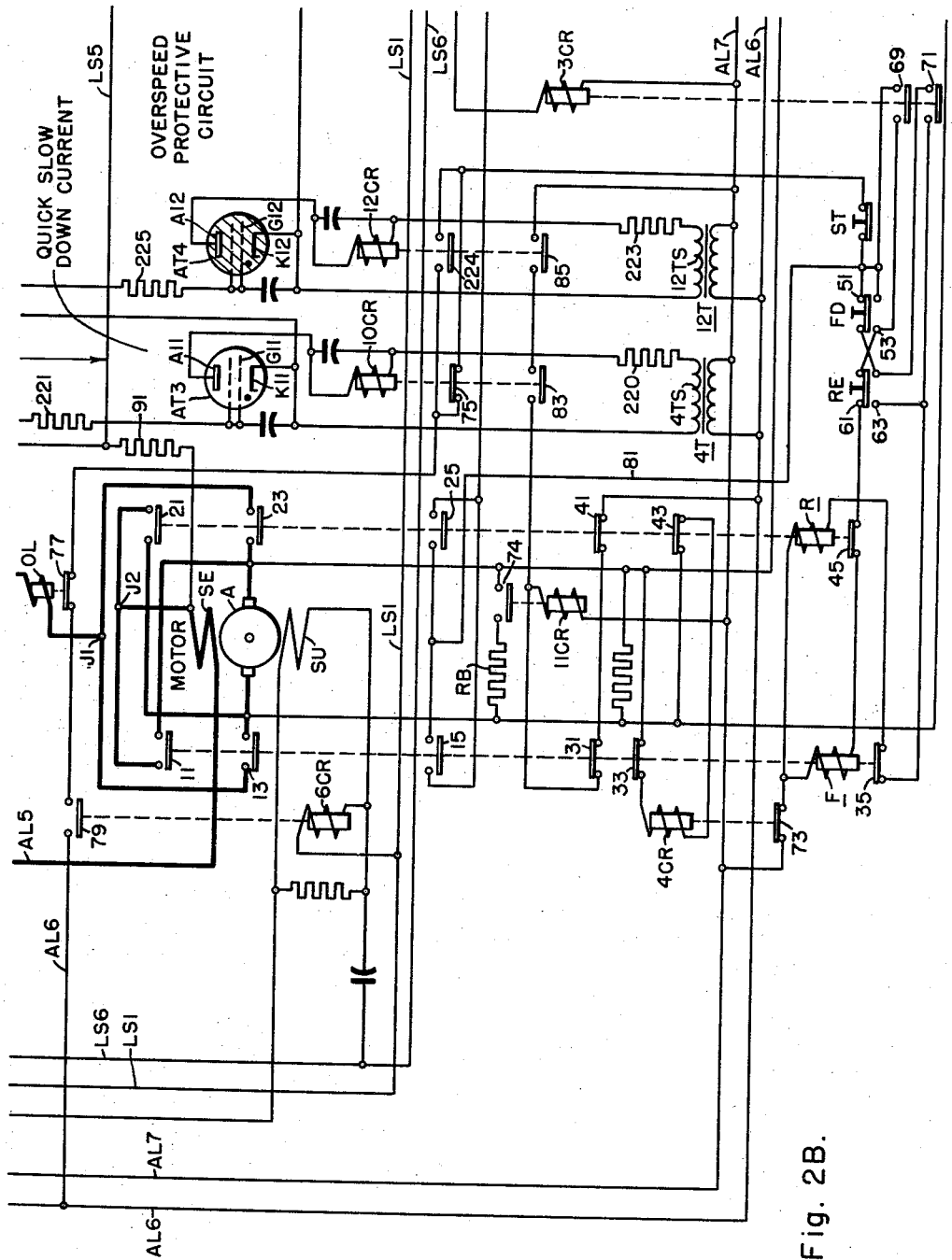
Figure 2C:
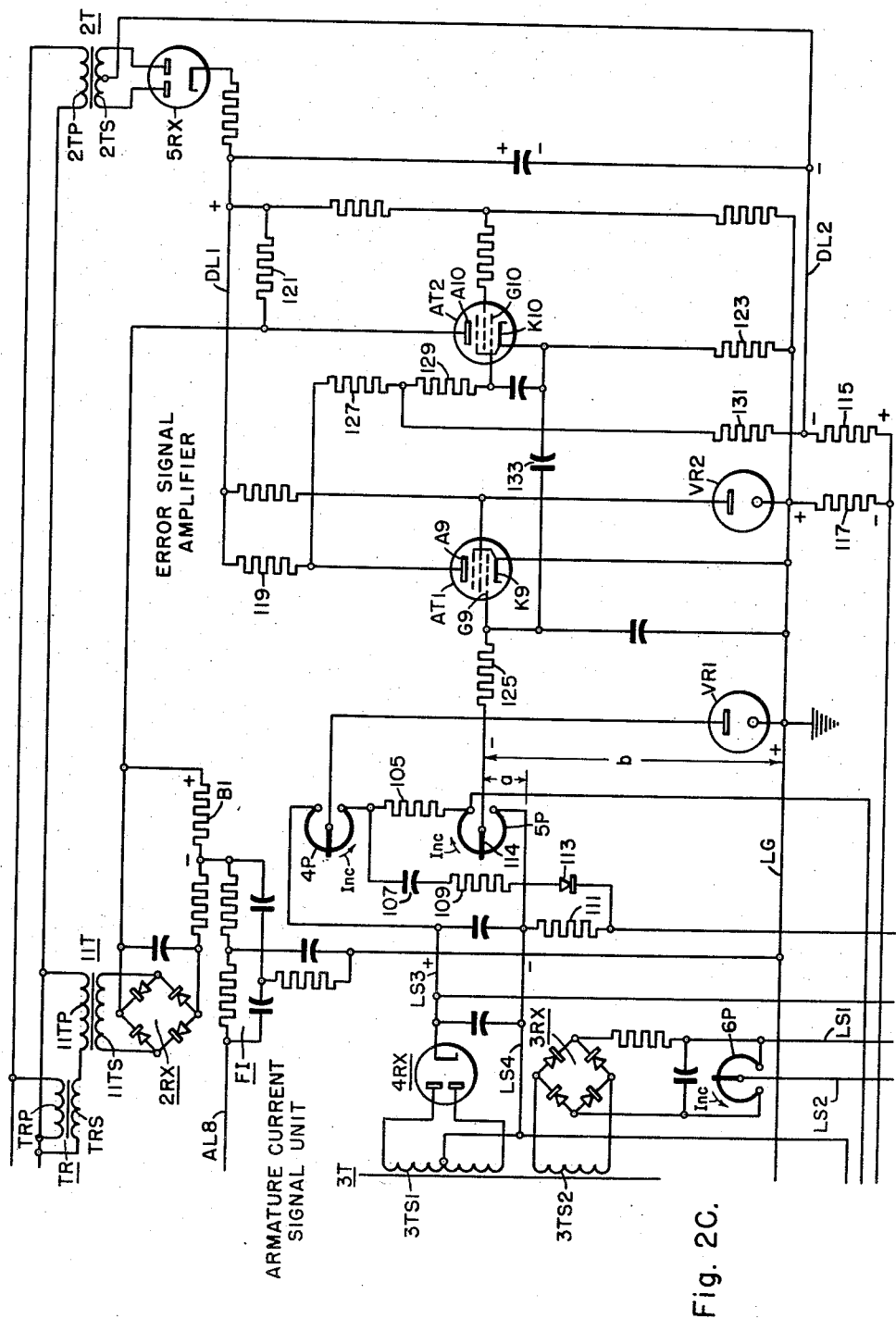
Figure 2D:
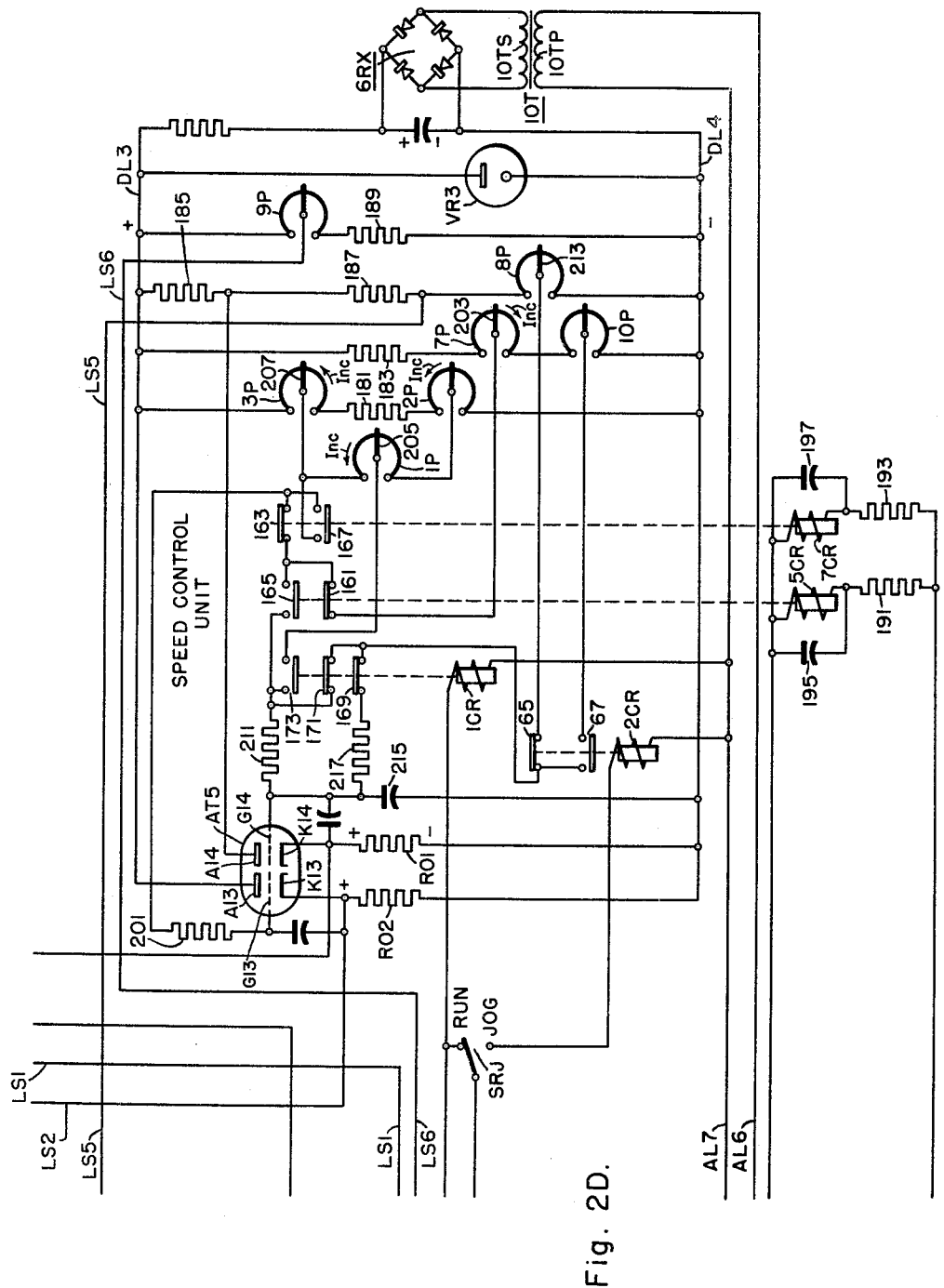
Figure 3A:
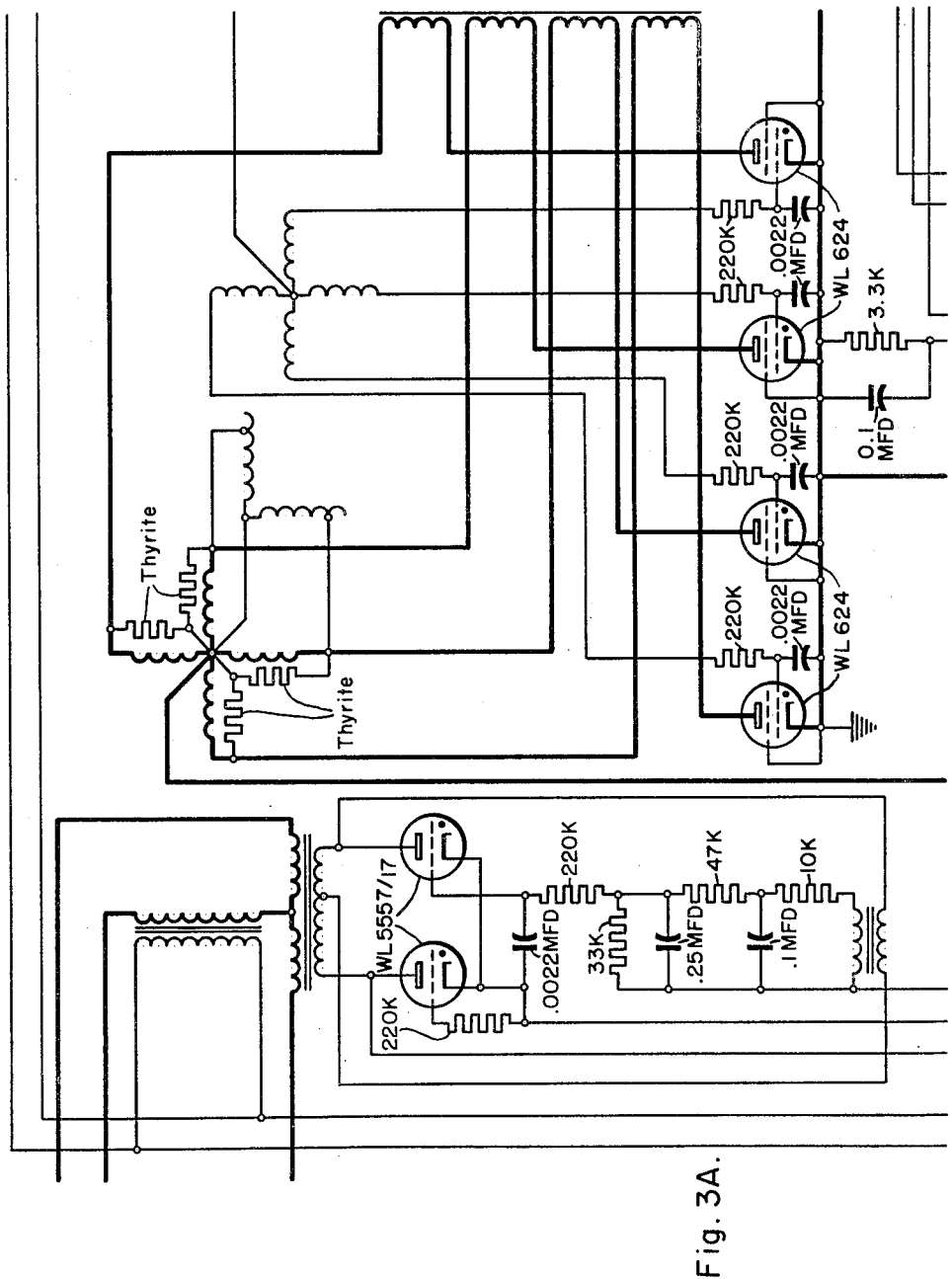
Figure 3B:
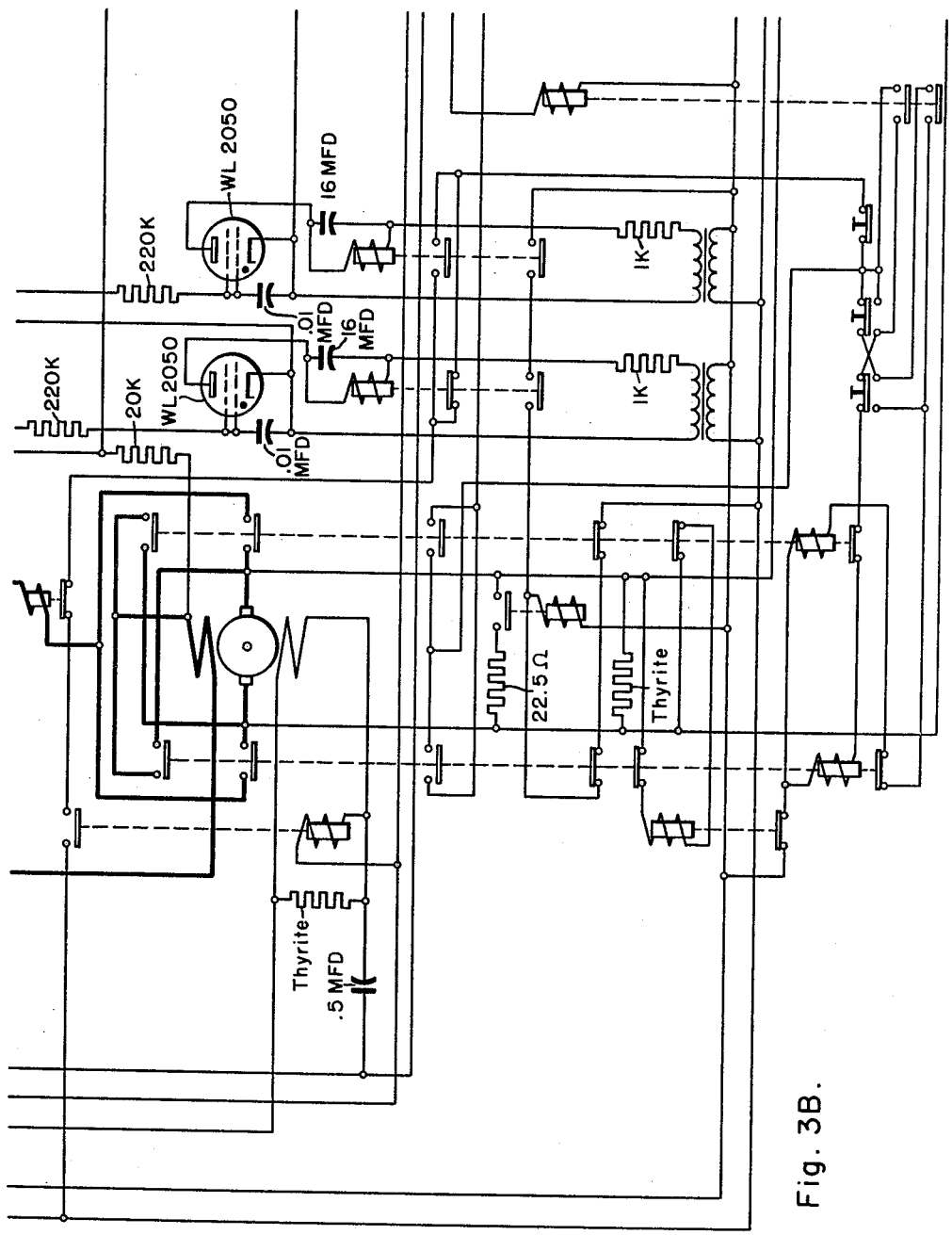
Figure 3C:
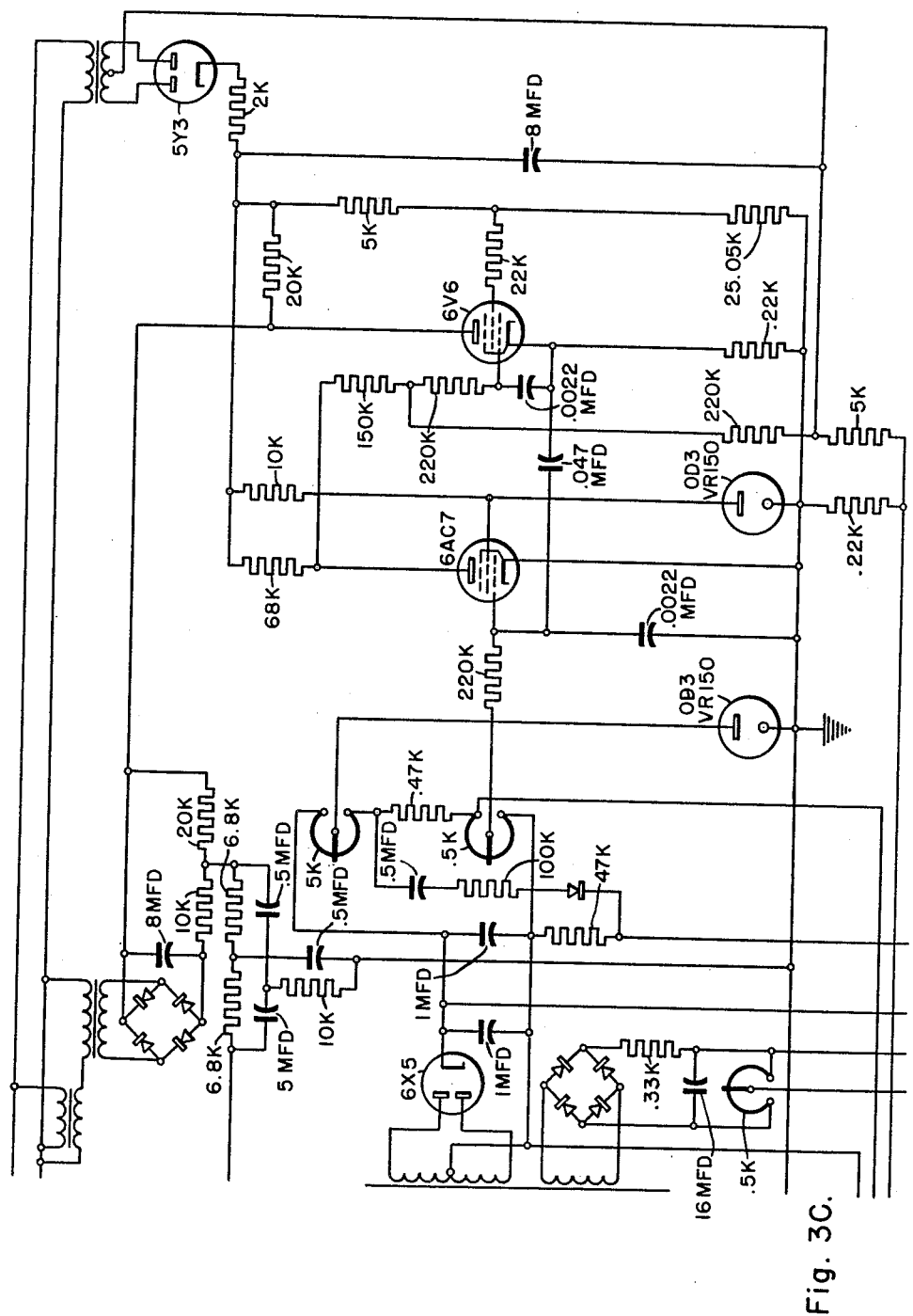
Figure 3D:
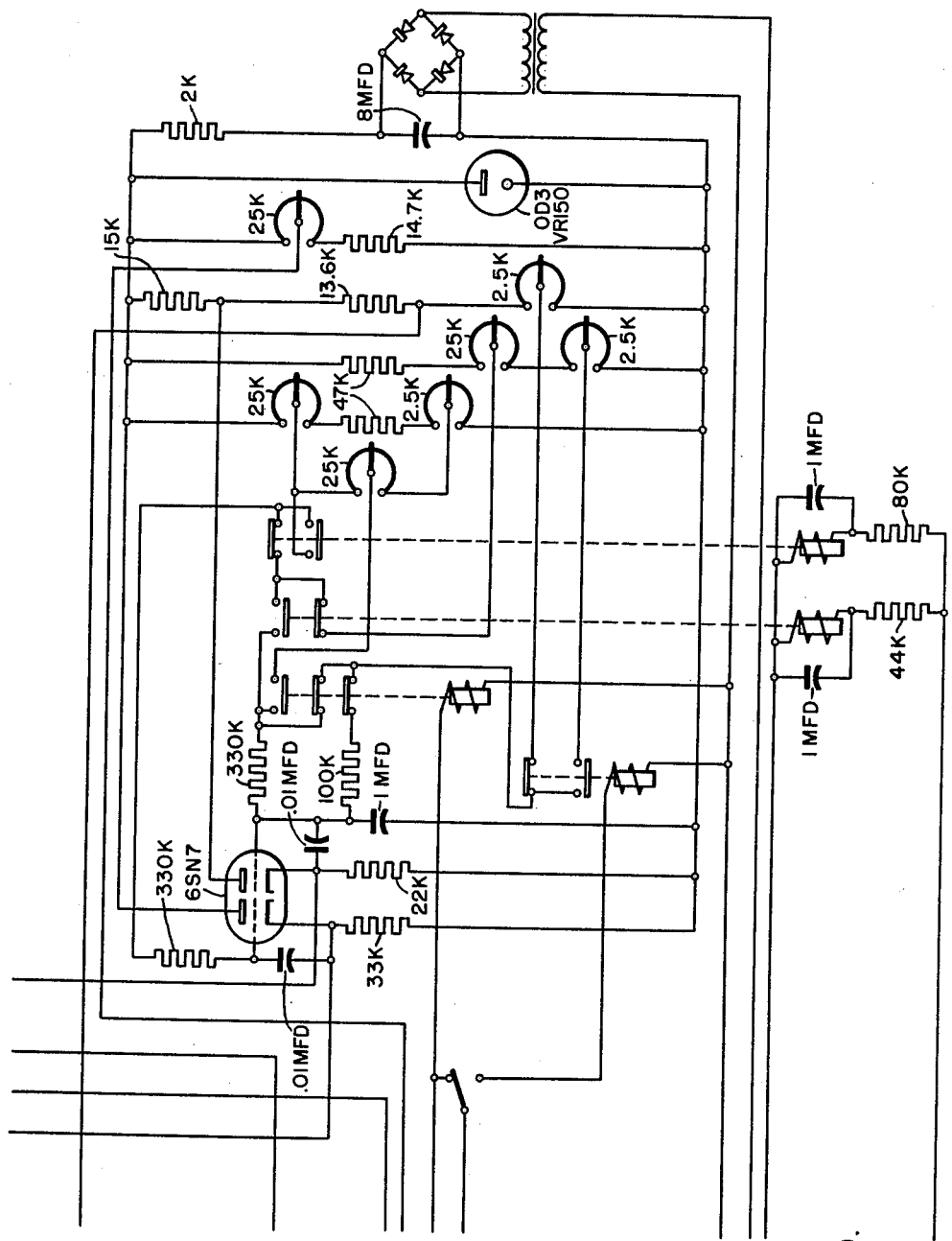

Feb. 27, 1962  F. E. McLANE ET AL  3,023,351
MOTOR CONTROL APPARATUS
Filed April 27, 1956  9 Sheets-Sheet 1

3,023,351
MOTOR CONTROL APPARATUS
Fletcher E. McLane, Lancaster, N.Y., John E. Pollack, St. Paul, Minn., and John M. Cochran, Williamsville, N.Y., assignors to Westinghouse Electric Corporation, East Pittsburgh, Pa., a corporation of Pennsylvania
Filed Apr. 27, 1956, Ser. No. 581,035
26 Claims. (Cl. 318—338)

This invention relates to electric discharge apparatus and has particular relation to motor control apparatus.

The current efforts to expand automation in industry has given rise to the demand for a precise wide range control for driving machine tool feeds. Such feed-drive control is effected by controlling the speed and direction of rotation of a driving motor. Severe conditions are imposed on this control. The speed of the motor must be controlled over a wide range, the highest speed bearing a ratio of as high as 200 to 1 to the lowest speed. The motor must be capable of delivering the rated torque over substantially this whole range of speeds. Thus, the demand has arisen for the delivery of the rated torque at speeds as low as 7½ revolutions per minute. The speed of the motor over the wide range must be set by operation of a single knob, for example, by setting a single speed potentiometer. In machine tool operation, it is desirable for the purpose of properly setting a tool that a facility for jogging the tool in small steps, that is for micro-jogging be available.

It is accordingly broadly an object of this invention to provide motor control apparatus particularly suitable for machine tool feed drive applications, A more specific object of this invention is to provide motor control apparatus in the use of which it shall be feasible to set the speed range of the motor over a wide range by setting a single control knob with the motor delivering its rated torque substantially over this whole range and particularly at low speeds.

A further specific object of this invention is to provide motor control apparatus which shall operate to maintain the motor speed and its torque precisely at any setting over a wide range of speeds.

Another specific object of this invention is to provide motor control apparatus including micro-jogging facilities.

An ancillary object of this invention is to provide a novel protective circuit for motor control apparatus.

Another ancillary object of this invention is to provide motor control apparatus having facilities for setting the motor at any speed over a wide range and for changing the speed of the motor from a high magnitude to a low magnitude in a relatively short time interval.

A further ancillary object of this invention is to provide a novel electronic circuit particularly suitable for motor operation control.

A still further ancillary object of this invention is to provide a novel electronic circuit particularly suitable for motor speed control.

This invention is characterized by a motor control circuit including a number of separate features which are so integrated as to meet the above stated requirements. Generally stated, the motor control circuit includes an armature power supply unit and a field power supply unit both of the electronic type. The armature supply unit includes a plurality of controlled electric discharge devices through which the armature current is supplied. One of the features of this invention is the provision of a high voltage alternating-current component in the control circuit of these discharge devices; on this component, an error signal, the direct current potential dependent on the current conducted through the armature, and thus on the IR drop across the armature, is superimposed. The direct-current potential and the alternating current component cooperate to shift the firing angles of the discharge devices and thus to compensate for the changing IR drop as the load on the motor changes.

Since the alternating current potential component is high, the direct-current error signal must also be substantial, and for this purpose an error signal amplifier of the direct current type is provided in accordance with this invention. The output of the error signal amplifier is connected to supply the direct current potential which cooperates with the alternating current component in the control circuits of the armature supply unit discharge devices. The amplifier is provided with negative rate-of-change feedback to suppress instability.

The field supply unit also includes electric discharge devices through which the field current is supplied. Only one of these devices is controlled. The control of this device is an outgrowth of the discovery that in prior art motor control apparatus the field current is affected by the surges which are produced when discharge devices in the armature supply circuit are commutating; that is, during the short interval when the current in one of the devices is decaying to zero while the current in the succeeding one is rising from zero and both devices are conducting. This potential is reflected into the control circuit for the field discharge device through the transformer through which both the armature and the field discharge devices are supplied. In accordance with this invention, the affect of the commutating of the armature discharge devices on the field circuit is suppressed by providing in the control circuit of the field discharge device a filtering network. In the practice of this invention, the anode and the control potentials for the field discharge device are derived from the same winding of the main transformer and the filtering network also serves as a phase-shift network to provide the necessary phase shift between potentials.

A novel speed control circuit is also provided in accordance with this invention. This speed control circuit is operable from a single speed-reference signaling source. One of the important features of the operation of this circuit is that the change in speed produced by changing the armature voltage is controlled separately from the change in speed produced by the weakening of the field. To achieve this mode of control, speed reference signal potentials are derived from a pair of cathode followers both controlled from the speed control device which is usually a variable resistor or potentiometer. The reference signal potential at the output of one follower is impressed to control the armature supply unit and that at the output of the other to control the field supply unit. Over the lower range of speeds, the speed control device is connected to the control electrode of the cathode follower associated with the armature; at higher speeds, the control device is connected to the control electrodes of both followers. As the control device is set for higher speeds in the lower range, the output of the associated cathode follower increases increasing the armature current. For a predetermined setting of the control device, the cathode follower becomes saturated and further increase of the armature current is prevented. In this region of armature current, the control device is connected to the control electrode of the field controlling cathode follower and thereafter, the field is weakened by increasing the reference signal potential (the output of the latter follower) until the maximum speed of the motor is reached. The conversion from low range to high range speed operation is effected by a relay responsive to the armature voltage. In situations in which the speed control device is initially set for maximum speed before the start button is actuated, this control provides for starting at full field excitation since the field controlling cathode follower is not connected to the control device until the motor comes up to substantial speed.

In accordance with this invention, field snubbing protection is also provided. The field snubbing protection comes into operation when, as the motor is being operated at maximum speed with a weak field applied to it, the field is suddenly reverted to full strength. Under such circumstances, the potential across the motor rises abruptly. The field snubbing protection is effected by a relay which is actuated when the armature potential reaches a substantially higher magnitude than its rating, say 150% of rated potential, and operates when so actuated to revert the field to the lower weak magnitude. This reduces the armature potential permitting the relay to drop out and repeating the above-described operation. The fluttering of the relay which thus results protects the armature from the excessive overvoltage.

Another feature of this invention relates to the micro-jogging facility of the control and arises from the realization that effective and precise micro-jogging is prevented in prior art apparatus by the requirement that the voltage across the motor armature be built up during each jogging operation. In such apparatus, power is applied at the beginning of each jogging operation, and the voltage across the armature builds up until the torque available on the shaft of the motor is adequate to overcome the frictional and inertial forces of the tool. Since the dynamic coefficient of friction is lower than the static coefficient of friction, the tool has a tendency to overshoot once the static frictional forces are overcome. In arriving at the micro-jogging aspect of this invention, it has been discovered that for effective precise micro-jogging, the apparatus to be moved must be struck short, sharp jarring blows by the motor shaft. Such momentary jarring blows disrupt the static frictional forces momentarily and allow the tool to move at lower torques than where the torque is gradually built up. In accordance with this invention, the armature voltage is built up to a low magnitude during stand-by. When, during jogging, the armature circuit contactor is closed momentarily, this low voltage is impressed immediately on the armature causing the armature to rotate instantaneously after the armature contactor is closed.

Another feature of this invention involves the slowdown of the motor when the speed reference signal potential is suddenly changed from a high-speed magnitude to a low-speed magnitude. Apparatus in accordance with this invention includes facilities for applying the braking mechanism to the motor under such circumstances. An electric discharge device which responds essentially to the difference between the counter electromotive force of the armature and the reference signal potential is rendered conducting to apply the brake to the motor when the counter electromotive force exceeds the reference signal by a substantial magnitude and the armature current is substantially zero.

In accordance with this invention, protective means is also provided for interrupting the supply of the armature current if the control fails and current is supplied to the armature independently of the control. It has been realized in arriving at this invention that under such circumstances the counter electromotive force exceeds by a substantial magnitude the speed reference signal potential, and at the same time there is a substantial armature current. The facility for interrupting the supply of current by the armature supply unit includes an electric discharge device which responds to the simultaneous presence of substantial armature current and counter electromotive force substantially exceeding the speed reference signal potential to cause the armature supply unit to interrupt the supply of current.

The novel features considered characteristic of this invention have been described generally above. The invention itself both as to its organization and as to its method of operation, together with additional objects and advantages thereof, will be understood from the following description of a specific embodiment when read in connection with the accompanying drawings in which:

FIG. 1 is a block diagram showing the essential features of this invention;

FIGS. 2A, 2B, 2C and 2D together constitute a circuit diagram of this invention; and FIGS. 3A, 3B, 3C and 3D together constitute a circuit diagram similar to that shown in FIGS. 2A, 2B, 2C and 2D but showing the magnitudes of the various components used in apparatus in accordance with this invention which has been constructed and found to operate satisfactorily.

FIGS. 3A through 3D are presented only for the purpose of aiding those skilled in the art in practicing this invention and not with any intention of limiting the scope of the invention in any way. Components, known to those skilled in the art, differing both as to magnitude and as to kind from those shown in FIGS. 3A through 3D can be used without departing from this invention, and the use of such different components is within the scope of this invention.

*Description*

The apparatus shown in the drawing includes a Motor, and Armature Power Supply Unit, a Field Power Supply Unit, and Armature Current Signal Unit, an Error Signal Amplifier, a Speed Control Unit, a Quick Slowdown Circuit and an Overspeed Protective Circuit. This apparatus is supplied from conductors L1, L2, L3 which may be energized from a commercial three-phase source through the usual disconnects (not shown). Power for the Armature Power Supply Unit is derived from the conductors L1, L2 and L3 through a Scott-connected transformer 1T having a primary 1TP and a secondary 1TS. The secondary 1TS is connected in star in a quadrature circuit and supplies potentials between conductors AL1, AL2, AL3, AL4, respectively, and a neutral conductor AL5. These potentials are successively displaced in phase by a quarter period of the supply. Each of the windings of 1TS is loaded by resistors 4, 5, 6 and 7, respectively.

The primary 1TP is provided with a teaser secondary 1ATS1 and a main secondary 1ATS2. The teaser secondary supplies auxiliary conductors AL6 and AL7. The main secondary 1ATS2 supplies the Field Power Supply Unit.

The Motor includes an armature A, a series winding SE and a shunt winding SU. The controlled field is supplied to the shunt winding SU.

The Motor is controlled by means of a forward contactor F and a reverse contactor R. Each of these contactors has a plurality of normally open contacts 11 and 21, 13 and 23, and 15 and 25, respectively, and a plurality of normally closed contacts 31 and 41, 33 and 43, and 35 and 45, respectively. An instantaneously actuable push button FD and RE is associated with the forward and reverse contactors R and F, respectively. Each of the push buttons RE and FD has normally closed and normally open contacts 51 and 61 and 53 and 63, respectively. In addition, there are the jogging relay 2CR, the lock-in relay 3CR and an auxiliary relay 4CR. Relay 2CR has a normally closed and a normally open contact 65 and 67, respectively, and relay 3CR has normally open contacts. Relay 4CR has a normally closed contact 73. There is also a run-jog switch SRJ. A dynamic braking mechanism is also associated with the Motor. This braking mechanism includes a low resistor RB adapted to be connected across the armature by the normally open contact 74 of an additional relay 11CR.

When the forward push button FD is actuated, a circuit is closed which extends from conductor AL7 through normally closed contact 73 of relay 4CR, the coil of contactor F, normally closed contact 45 of contactor R, normally closed contact 61 of push button RE, the now closed contacts 53 of push button FD, a stop push button ST, the normally closed contact 75 of a relay 10CR in the Quick Slowdown Circuit, the normally closed contact 77 of the overload relay OL, normally open contacts 79 of a field relay 6CR, which are closed during operation, to the conductor AL6. A similar circuit may be closed through the coil of the reversing contactor R when the push button RE is actuated. Whichever of the buttons FD or RE is actuated, a corresponding contactor F or R, respectively, is actuated. Contacts 11 and 13 or 21 and 23 are then closed connecting the armature A in the Armature Power Supply Unit in one direction or the other. The normally closed contacts 51 and 61 of push buttons FD and RE are interlocked preventing the simultaneous closing of the circuits through both coils of the contacts R and F.

With the run-jog switch SRJ in the run position and one of the buttons FD or RE closed, the coil of relay 3CR is connected in a circuit extending from conductor AL7 through the coil, the switch SRJ, the normally open contact, 15 or 25 of one or the other of the contactors F or R, whichever is actuated, a common conductor 81, the stop button ST, the normally closed contact 75 of the relay 10CR in the Quick Slowdown Circuit, the normally closed contact 77 of the overload relay OL, the normally open contact 79 of relay 6CR to conductor AL6. When the relay 3CR is actuated its normally open contacts 69 and 71 close to lock the closed contactor F or R independently of the buttons FD or RE, as the case may be.

When the run-jog switch SRJ is in the jog position, and button FD or RE is actuated, the coil of the relay 2CR is adapted to be connected in circuit extending from the conductor AL7 through the switch SRJ, the normally open contacts 15 or 25 of the contactor F or R whichever happens to be actuated, the common conductor 81, the stop button ST, the normally closed contact 75 of the relay 10CR, the normally closed contacts 77 of the overload relay OL, the normally open contact 79 of the relay 6CR to conductor AL6.

The coil of relay 11CR is connected between conductors AL6 and AL7 through normally closed contacts 31 and 41 of the contactors F and R, and with these contactors deenergized, the relay 11CR is actuated to connect the braking resistor RB to the armature A. With one or the other of the contactors F or R energized, the energizing circuit for the coil of the relay 11CR is open and the braking resistor RB is disconnected from the armature A. The coil of the relay 11CR may also be connected between conductors AL6 and AL7 through normally open contacts 83 and 85 of relays 10CR in the Quick Slowdown Circuit and 12CR in the Overspeed Protective Circuit when the latter are energized. Under such circumstances, the braking resistor RB is connected to the armature even if one of the contactors F or R is actuated.

The coil of relay 4CR is adapted to be connected across the armature A through normally closed contacts 33 and 43 of the contactors F and R. Thus, if there is potential across the armature A and contactors F and R are both deenergized, relay 4CR is actuated preventing the closing of any circuit through either of the coils of the contactors F or R.

In addition to the above-mentioned components, an armature potential responsive network N1 is associated with the armature. This network includes a capacitor 87 shunted by a resistor 89. This network N1 is adapted to be connected across the armature A through the coil of relay OL, contacts 13 or 23 depending on which of the contactors F or R is actuated, the armature A, contacts 11 or 21 depending on whether contactor F or R is actuated, a resistor 91 to network N1. The network N1 thus provides a potential which is substantially proportional to the potential across the armature when the Motor is energized.

The Armature Power Supply Unit includes a plurality of thyratrons T1, T2, T3 and T4 and a current transformer 3T. In addition, there are a pair of transformers 8T and 9T for supplying an alternating current potential component to the thyratrons T1 through T4. Each of the thyratrons T1 through T4 has an anode A1 through A4, a cathode K1 through K4 and a control electrode G1 through G4. The transformer 3T has a plurality of primaries 3TP1 through 3TP4 and a pair of secondaries 3TS1 and 3TS2. The control transformers 8T and 9T each has a primary 8TP and 9TP and a secondary 8TS and 9TS.

The anode A1 is connected to conductor AL1 through the primary 3TP1, the anode A2 to conductor AL2 through the primary 3TP2, the anode A3 to the conductor AL3 through the primary 3TP3 and the anode A4 to conductor AL4 through the primary 3TP4. The cathodes K1 through K4 are connected together to a ground conductor LG. The armature A is adapted to be connected between conductors AL5 and ground LG in a circuit extending from conductor AL5 through the series windings SE, the normally open contacts 11 or 21 of the forward contactor F or the reverse contactor R, depending on which is actuated, the armature A, normally open contacts 13 or 23 of the actuated contactor F or R, the coil of the overload relay OL to ground LG. Thus, when either the contactor F or the contactor R is actuated, current may be supplied to the armature through the thyratrons A1 through A4 in quadrature in a direction depending on which of the contactors is actuated. This current flows through the primaries 3TP1 through 3TP4 of the current transformer 3T. Thyratrons T1 through T4 conduct in succession. The conduction of current passes from one thyratron to the next during each quarter period and when this occurs there is a short commutating interval when the thyratron which is becoming conducting and the one which is becoming non-conducting, both conduct. This causes a surge.

When the thyratrons T1 through T4 are conducting, a circuit is also closed from conductor AL5 through winding SE, resistor 91, network N1 to ground LG. A potential is thus available between points J1 and J2 when the thyratrons conduct; such a potential serves for microjogging.

The primary 8TP is connected across one of the windings 93 of the secondary 1TS; the primary 9TP is connected across another of the windings 95, the latter being in quadrature with the former. The potentials of primaries 8TP and 9TP are thus in quadrature. The secondaries 8TS and 9TS are connected in star so that the potentials between their terminals and a common neutral conductor AL8 are successively in quadrature. The terminals of secondary 9TS are connected to the control electrodes G1 and G3, each through a grid resistor 97 and 99, respectively. The terminals of the secondary 8TS are also connected to the control electrodes G2 and G4, each through a grid resistor 101 and 103, respectively. The common conductor AL8 is connected through the Error Signal Amplifier to ground LG and thus to the cathodes K1 through K4. The potentials of the secondaries 8TS and 9TS are thus impressed as an alternating current component in the control circuits of the thyratrons T1 through T4. The primaries 8TP and 9TP are so related to the windings of the primaries 1TS that the alternating current potential components supplied to the thyratrons T1 through T4 lag the corresponding anode potentials by approximately a quarter period of the supply.

The Armature Current Signal Unit includes a pair of rectifiers 3RX and 4RX which are supplied with potentials from the secondaries 3TS2 and 3TS1, respectively, of the current transformer 3T and supply direct current signals to signal conductors LS1, LS2, LS3 and LS4. The direct current potentials thus supplied are filtered and are thus substantially ripple-free. Conductor LS1 is connected to the Field Power Supply Unit, conductor LS2 to the Speed Control Unit.

The Armature Current Signal Unit also includes variable resistors 4P, 5P and 6P, one of which, 4P, is set for the armature current limit, another, 5P, for minimum and the third, 6P, for maximum speed compensation. The potential supplied between conductors LS1 and LS2 is set by variable resistor 6P. Variable resistors 4P and 5P are connected between conductors LS3 and LS4 through a resistor 105. The adjustable arm of resistor 4P is connected to ground LG through a voltage regulator VR1. The junction of resistor 4P and the fixed resistor 105 is connected to conductor LS4 through a capacitor 107, a pair of resistors 109 and 111 and a rectifier 113. The capacitor 107 is capable of being charged when the positive potential of conductor LS3 is increased with respect to conductor LS4 but is incapable of discharging, except by leakage. Thus, a sudden increase in the positive potential of conductor LS3 results in a momentary compensating increase in the potential of conductor LS4 depending on the rate of charge of the capacitor 107. This has the effect of suppressing an abrupt increase in the potential of the adjustable arm 114 of 5P relative to ground LG when LS3 increases abruptly in positive potential. A corresponding abrupt decrease in the potential between LS1 and LG responsive to an abrupt decrease in the potential between LS3 and LS4 is not prevented. This means that when the armature current increases sharply the change in IR compensation is delayed, but when the armature current decreases (speed decreases), IR compensation is changed instantaneously.

The Error Signal Amplifier is energized from direct current supply conductors DL1 and DL2 which are energized from the conductors AL6 and AL7 through a rectifier 5RX. The direct current is filtered and is substantially ripple-free. The negative conductor DL2 is connected to ground through resistors 115 and 117 in series.

The Amplifier includes high vacuum tubes AT1 and AT2 which are each of the pentode type including an anode A9 and A10, a control grid G9 and G10, and a cathode K9 and K10. The anode A9 of the input AT1 is connected to positive conductor DL1 through an anode resistor 119. The cathode K9 is connected to ground LG. The anode A10 of tube AT2 is connected to conductor DL1 through an anode resistor 121, and the cathode K10 is connected to ground through a feed-back resistor 123. The grid G9 is connected through a grid resistor 125 to the adjustable arm 114 of the minimum speed compensation resistor 5P. A signal dependent on the current flowing through the armature A is thus impressed in the control circuit of the tube AT1. The potential of the anode A9 is impressed on the grid G10 through a coupling resistor 127 and a grid resistor 129. The coupling resistor 127 is connected to the negative conductor DL2 through another resistor 131. The junction of the cathode K10 and the feed-back resistor 123 is connected to the grid G9 through a capacitor 133. The feedback thus produced is of the negative rate-of-change type and tends to suppress the effects of ripples and other variations on the Error Signal Amplifier.

The anode A10 is connected through a biasing resistor B1 and a filter FI to the conductor AL8. The biasing resistor B1 derives its power through a rectifier 2RX from a transformer 11TP which is supplied from conductors AL6 and AL7 through a constant potential transformer TRP, such as a Sola transformer, for example. The bias B1 is thus highly constant. The polarity of the bias B1 is of such polarity as to oppose the potential supplied from the output of the Error Signal Amplifier. The filter FI is tuned to suppress the impressing of signals on conductor AL8 which are within the frequency range in which the Motor resonates mechanically.

The output of the Error Signal Amplifier which supplies a signal dependent on the magnitude of the current flowing through the armature A is thus impressed in the control circuits of the thyratrons T1 through T4 in series with the bias B1 and the ripple derived from the transformers 8T and 9T. The ripple potential is of substantial magnitude of the order of 75 volts, and the output of the Error Signal Amplifier is correspondingly high so that high precision is achieved.

The control circuit for tube AT1 and thus for the Error Signal Amplifier extends from the grid G9 through the grid resistor 125, the lower section of resistor 5P, the resistor 111, one of the output resistors RO1 of the Speed Control Unit, the variable resistor 8P in the Speed Control Unit, a conductor LS5, the network N1 from which a potential dependent on the armature potential is derived to ground LG. In this control circuit, there is thus in addition to a speed reference signal potential (RO1) a potential substantially equal to the algebraic difference between the potential across the armature (N1) and the current dependent potential derived from the variable resistor 5P. This latter potential is substantially equal to the counter electromotive force of the armature A. Also in this control circuit, an increase in the positive potential of conductor LS3 results in an increase in the control potential on grid G9, a decrease in the potential of anode A9 and an increase in the positive potential of anode A10. Accordingly, the potential of the anode A10 increases as the potential between conductors LS3 and LS4 increases. Thus, the conductivity of the thyratrons T1 through T4 increases as the current flow through the armature increases. Any increased IR drop across the armature is thus compensated by the increasing current flow through the thyratrrons T1 through T4. If the increase of AL3 to AL4 potential is relatively abrupt, there is initially a corresponding increase in the potential of conductor LS4 so that abrupt variations in the control potential of the tube AT1 are suppressed. A decrease in the potential of conductor LS3 relative to LS4 does not produce a corresponding compensating decrease in the potential of conductor LS4. Since such a decrease would result from a decrease in the speed of the motor, and it is desired that the speed decrease as fast as practicable, the smoothing out in this instance is not desirable.

The Field Power Supply Unit is supplied from a pair of thyratrons T5 and T6. Each of the thyratrons has an anode A5 and A6, a cathode K5 and K6 and a control electrode G5 and G6. The thyratron T5 operates as a rectifier, its grid G5 being connected to its cathode K5 through a resistor 141. Thyratron T6 is controlled. In the control circuit of thyratron T6, an alternating current potential is impressed from the secondary 1ATS2 through a transformer 5T. Across the secondary of this transformer, a combined filter and phase-shift network N2, including a plurality of resistors 143, 145 and 147 and capacitors 149 and 151 are connected. The network N2 is connected at one terminal to the grid G6 through a grid resistor 153. At the other terminal, it is connected to a control conductor LS6. The cathodes of the thyratrons T5 and T6 are also connected together to a conductor LS1.

The network N2 introduces a lag in the phase of the A.C. component impressed between the control electrode G6 and the cathode K6, and the anode potential impressed on T6. In addition, the filtering action of N2 suppresses the effects of the surges produced when the thyratrons T1 through T4 commutate which are reflected through the transformer 1T into the control circuit of thyratron T6.

The Speed Control Unit is supplied from direct current conductors DL3 and DL4 which are energized from conductors AL6 and AL7 through rectifier 6RX. The direct-current potential between conductors DL3 and DL4 in addition to being substantially ripple-free is maintained of substantially constant magnitude by a voltage regulator VR3.

The Unit includes a double triode AT5 having a pair of anodes A13 and A14, a pair of cathodes K13 and K14, and a pair of grids G13 and G14. The Unit also includes a full field relay 5CR, a field snubbing relay 7CR and a starting relay 1CR. The full field relay 5CR and the snubbing relay 7CR each has a normally closed contact 161 and 163 and a normally open contact 165 and 167. The relay 1CR has a pair of normally closed contacts 169 and 171 and a normally open contact 173.

The Speed Control Unit further includes a pair of variable resistors 2P and 3P which are connected in series with a fixed resistor 181 between the positive and negative conductors DL3 and DL4. A speed-setting, variable resistor 1P is connected between the adjustable arms of the resistors 2P and 3P. This resistor 1P is the speed control device.

The Speed Control Unit also includes variable resistors 7P for setting the maximum field volts and 10P for setting the jogging potential. 7P and 10P are connected in series with a fixed resistor 183 between the positive and negative conductors DL3 and DL4. There is further the standby resistor 8P for setting the initial potential applied during jogging connected in series with a pair of fixed resistors 185 and 187 between the positive and negative conductors DL3 and DL4, and an overlap variable resistor 9P connected in series with a fixed resistor 189 between the same conductors.

The coils of the full field relay 5CR and of field snubbing relay 7CR are each connected through a resistor 191 and 193 across the armature A. Each of the coils is also shunted by a capacitor 195 and 197. The resistor 191 for the full field relay 5CR is set so that this relay is actuated when the voltage across the armature approaches rated voltage. In the usual practice of this invention, the setting is such that relay 5CR is actuated at about 85% rated voltage. The resistor 193 in series with the coil of the relay 7CR is set so that this relay is actuated when the voltage across the armature A is substantially higher than rated voltage but not so high as to result in damage to the armature if applied for a reasonably short interval. In the practice of this invention, the resistor 193 is so set that the field snubbing relay 7CR is actuated at about 150% of rated voltage.

The sections A13, K13, and A14, K14, respectively, of the double triode AT5 are each connected as a cathode follower. The anode A13 is connected to the positive conductor DL3. The cathode K13 is connected to the negative conductor DL4 through an output resistor RO2. The grid G13 is connected through a grid resistor 201 and contacts 163 and 161 to the arm 203 of the maximum field resistor 7P. Thus, with the apparatus set for stand-by, the conductivity of the follower A13—K13 is set by 7P and is such that the maximum field is supplied. The grid G13 is also adapted to be connected through grid resistor 201, the normally closed contact 163 of relay 7CR, normally open contact 165 of relay 5CR and normally open contact 173 of relay 1CR to the adjustable arm 205 of the speed-setting resistor 1P. The grid G13 is also adapted to be connected to the arm 207 of the maximum speed resistor 3P through the grid resistor 201 and the normally open contact 167 of relay 7R. Thus, when relay 7CR is actuated, the potential of the arm 207 of 3P is applied to the grid G13.

The anode A14 is connected to the junction of resistors 185 and 187. The cathode K14 is connected to conductor DL4 through output resistor RO1. The grid G14 is adapted to be connected to the adjustable arm 205 of the speed-setting resistor 1P through a grid resistor 211 and the normally open contact 173 of the relay 1CR. Thus, with relay 1CR actuated, the speed-setting resistor is connected to the grid G14, and the follower A14—K14 is controlled by the speed-setting resistor. The grid G14 is also connected through the grid resistor 211, contact 171 of relay 1CR and contact 65 of relay 2CR to the arm 213 of the stand-by resistor 8P.

The adjustable arm 213 of the stand-by resistor 8P is connected in a closed network with a capacitor 215; this network extends from the adjustable arm 213 through the normally closed contact 65 of the relay 2CR, the normally closed contact 169 of the relay 1CR, a resistor 217, the capacitor 215, to the negative terminal of the resistor 8P. The capacitor is also directly connected between the grid G14 and the negative conductor DL4, and with relay 1CR actuated and contact 173 closed is connected in a network with grid resistor 211 and variable resistors 1P and 2P. With relay 2CR actuated, capacitor 215 is connected in a further network with resistor 211, contact 171, contact 67 and resistor 10P. Thus, in the stand-by condition of the apparatus, the conductivity of the follower A14—K14 and speed reference signal across RO1 provided by it is determined by the setting of the stand-by resistor 8P. This setting is such that the Error Signal Amplifier is controlled to supply low current to the armature A (through N1 and SE). When the apparatus is set for jog and one of the buttons FD or RE is actuated, the conductivity of the follower A14—K14 is determined by the setting of the jogging speed resistor 10P, but the change from the setting of resistor 8P to resistor 10P is gradual depending on the adjustment of the charge on capacitor 215. When the apparatus is set for run the conductivity of follower A14—K14 is determined by resistor 1P but the change from resistor 8P to 1P is gradual depending on the adjustment of the charge on capacitor 215.

The output resistor RO2 of follower A13—K13 is connected in circuit with the control conductors LS1 and LS6 which extends from the positive terminal of the output resistor RO2 through the set portion of the variable resistor 6P, conductor LS1, the control circuit of thyratron T6, conductor LS6, overlap resistor 9P, the resistor 189 in series with it, to the negative terminal of the direct current supply which is the same as the negative terminal of the output resistor RO2. The control circuit of T6 is thus adapted to have impressed in it a direct current potential determined by the conduction through the output resistor RO2 of the follower A13—K13, and this, in turn, is dependent on the setting of the speed-setting resistor 1P when relay 5CR (and relay 1CR) is actuated, on the setting of the maximum speed resistor 3P when relay 7CR is actuated and on the setting of the resistor 7P when neither is actuated. It is seen that in stand-by, the speed signal potential of resistor RO2 is at the maximum field setting, when relay 5CR is actuated the signal potential corresponds to 1P and when relay 7CR is actuated, the control circuit of thyratron T6 is set for the maximum speed setting, and the shunt field (SU) should be at its minimum, that is, at its maximum weakness.

The output resistor RO1 of follower A14—K14 is connected in a circuit extending from the positive terminal of this resistor RO1 through the resistor 111 in series with conductors LS3 and LS4, the minimum speed compensation resistor 5P, the grid resistor 125 in series with grid G9 to grid G9, then from the cathode K9 through the ground LG, the network N1 across which the armature-voltage dependent potential appears, the conductor LS5, the variable resistor 8P to the negative conductor DL4 of the direct current supply which is the same as the negative terminal of the resistor RO1. The potential of the output resistor of follower A14—K14 which is a speed reference signal potential is thus impressed in the control circuit of tube AT1 and thus controls the output of the Armature Power Supply Unit. The potential across the output resistor of follower A14—K14 is determined by the setting of the stand-by resistor 8P in stand-by, by 10P during jogging and by the setting of the speed-setting resistor 1P when relay 1CR is actuated.

When relays 1CR or 2CR are actuated at the beginning of an operation and the adjustable arm 205 of the speed-setting resistor 1P or the resistor 10P is abruptly connected to the grid G14, the charge on the capacitor is adjusted in a relatively short interval thus preventing the sudden application of potential corresponding to the speed or jog setting in the control circuit of tube AT1. This prevents the Error Signal Amplifier from abruptly increasing the conduction of thyratrons T1 through T4. Such abrupt increase would otherwise take place since the regulating loop, including the Error Signal Amplifier and the control circuits of thyratrons T1 through T4, has a relatively low time constant.

The Quick Slowdown Circuit includes a thyratron AT3 having an anode A11, a cathode K11 and a control electrode G11. The thyratron is supplied with anode-cathode potential from the secondary 4TS of a transformer 4T which is energized from the conductors AL6 and AL7. The anode circuit extends from one terminal of the secondary through an anode resistor 220, the exciting coil of relay 10CR, the anode A11, the cathode K11, to the other terminal of the secondary 4TS. The control electrode G11 is connected in a circuit extending from the control electrode through a grid resistor 221, the resistor 117, the conductor LG, the network N1 across which the armature-voltage potential appears, conductor LS3, the stand-by resistor 8P, the output resistor RO1 of the follower A14—K14, the resistor 111 in series with the conductor LS4, the variable resistor 5P, to the cathode K11. This control circuit includes a negative bias supplied by the resistor 117, the drop across the output resistor RO1 of the follower A14—K14, a portion of the potential dependent on the armature current, and a potential dependent on the voltage across the armature. The potential dependent on the armature current is in effect a potential dependent on the IR drop across the armature. The potential dependent on the armature voltage is in effect a potential dependent on the sum of the counter electromotive force plus the IR drop. The current dependent potential and the armature dependent potential are so impressed in this circuit that the net voltage in the circuit is substantially equal to the difference between the armature voltage and the IR drop, and thus to the counter electromotive force of the armature. The other important component in this circuit is the potential across the output resistor RO1 of the follower A14—K14. This potential is determined by the speed-setting resistor 1P during normal operation and is in effect a speed reference signal potential. Thus, the potential in the control circuit of thyratron AT3 is in effect equal to the algebraic difference between the counter electromotive force and the speed reference signal potential derived from the resistor of follower A14—K14. The counter electromotive force and the speed reference signal potential are so related that when the counter electromotive force potential substantially exceeds the speed reference signal potential, thyratron AT3 is rendered conducting, actuating relay 10CR.

The Overspeed Protective Circuit includes a thyratron AT4 having an anode A12, a cathode K12 and a control electrode G12. This thyratron is supplied with anode-cathode potential from the secondary 12TS of a transformer 12T energized from the conductors AL6 and AL7. One terminal of the secondary 12TS is connected through an anode resistor 223 and the coil of relay 12CR to the anode A12, and the cathode K12 is connected to the other terminal of the secondary 12TS. The relay has a normally open contact 224 which shunts normally closed contact 75 of relay 10CR in addition to the contact 85. The relay 12CR is so related to the relay 10CR or the coil circuit of the former is so related to the coil circuit of the latter that contact 224 closes before contact 75 opens. The control electrode G12 and the cathode K12 are connected in a circuit extending from the control electrode through a grid resistor 225, conductor LS4, conductor LS3 to the cathode K12. Thyratron AT4 is thus responsive to the potential between conductors LS3 and LS4. This thyratron is non-conducting so long as there is substantial potential between LS3 and LS4 but becomes conducting when this potential approaches zero, that is, thyratron AT4 conducts when the current through the armature is low.

*Stand-by*

In the stand-by condition of the apparatus, the disconnects (not shown) connected to conductors L1, L2 and L3 are closed and transformer 1T is energized. With transformer 1T energized, secondaries 1TS, 8TS and 9TS are energized and potential is supplied between the conductors AL1 through AL4 and conductor AL5. Anode potentials are accordingly available for the thyratrons T1 through T4, and the ripple control potential from secondaries 8TS and 9TS is impressed. In addition, the cathodes of all of the thyratrons and the other discharge devices are heated so that all discharge devices are ready to conduct. Since transformer 1T is energized, teaser secondary 1ATS1 and main secondary 1ATS2 are also energized, and potential is supplied to conductors AL6 and AL7 and also to the anode circuits of thyratrons T5 and T6 and to the control circuit of thyratron T6. Potential is also supplied through conductors AL6 and AL7 to transformers 2T, 4T, 10T and 12T. Direct current potential for the Error Signal Amplifier and the Speed Control Unit is then available. In addition, the bias B1 is energized, and potential is available for the thyratrons AT3 and AT4.

With the apparatus in stand-by, the conductivity of follower A13—K13 is determined by the maximum field resistor 7P. This is so set that the conduction of the field current through the field winding SU is at a maximum. Relay 6CR is then actuated and its normally open contact 79 is closed. The follower A14—K14 is at this point controlled by the stand-by resistor 8P, and its current is so set that a small potential is available between points J1 and J2.

In stand-by, RE and FD are unactuated so that R and F are unactuated. 11CR is then energized through contacts 31 and 41 and the braking resistor RB is connected to the armature. The current through N1 and Se is determined by the setting of 8P and is small, and the potential across LS3—LS4 may be small. AT4 may then be energized and 12CR actuated. But this has no effect since contact 224 shunts closed contact 75 and now closed contact 85 is in series with open contact 83.

*Micro-jogging*

To set a tool for operation, it is usually desirable that the tool be jogged into the proper position. For this portion of the operation, the switch SRJ is set in the jog position, and one or the other of the buttons FD or RE is actuated depending on the desired movement of the tool. For purposes of example, it may be assumed that the switch FD is actuated.

The actuation of the button FD actuates the contactor F. Normally open contacts 11 and 13 of this contactor are now closed, closing the circuit between conductors AL1 through AL5 and the armature A so that the armature is supplied with current of one polarity. The initial potential impressed is that between points J1 and J2 and depends on the setting of the stand-by resistor 8P. In addition, the other normally open contact 15 of the contactor F closes, causing relay 2CR to be actuated. This applies the potential of the jog resistor 10P to the grid G14 through the now closed contact 67 of relay 2CR and a normally closed contact 171 of relay 1CR. The armature voltage is thus increased (depending on the rate of recharging of the capacitor 15). In addition, contact 31 is opened, relay 11CR drops out and the braking resistor RB is disconnected from the armature A. A sharp jar is thus imparted to the tool by the shaft of the Motor.

The actuation of the push button FD and of the push button RE is momentary. The jogging operation may be repeated by releasing and reactuating button FD until the tool is set.

*Operation*

For normal operation, the switch SRJ is moved to the run position. In this position, the apparatus is ready to operate. The resistors 2P and 3P are now set to correspond to the minimum speed and the maximum speed of the Motor, and the current limit and maximum and minimum speed compensation resistors 4P, 5P and 6P are also properly set. The speed resistor 1P is set for low initial speed, and the overlap resistor 9P is set so that the field has the proper magnitude when its weakening is initiated.

Now the closing of one of the buttons FD or RE starts the rotation of the Motor. Assume that the button RE is closed. The closing of the button RE closes a circuit through contactor R. The armature is now connected through the now closed contacts 21 and 23 of the contactor R to the Armature Power Supply Unit. Through contact 25, relay 3CR is actuated locking in contactor R independently of button RE and relay 1CR is actuated. At another now open contact 43 of the contactor R, the circuit through the coil of relay 4CR is maintained open so that the actuation of this relay is prevented. At a third now open contact 45, the actuation of the forward contactor F is prevented.

In addition, the relay 11CR is deenergized at contact 41 and resistor RB is disconnected from the Motor. The actuation of relay 1CR connects the adjustable arm of the speed-setting resistor 1P to the grid G14. The control potential on G14 gradually increases from the setting of the stand-by resistor 8P to the setting of resistor 1P at a rate determined by the discharge of the capacitor 215 originally in circuit with resistor 8P. The conductivity of A14—K14 and of the thyratrons T1 through T4 is thus increased at this rate, and the abrupt application of potential corresponding to the setting of the resistor 1P is prevented. This prevents excessive initial current flow in the thyratrons T1 through T4 which would otherwise result because of the low time constant of the regulating loop including the Error Signal Amplifier. The current through the armature now rises to the magnitude of the current conducted by the thyratrons T1 through T4, and the armature A rotates at the rate corresponding to the initial speed setting.

The speed of the Motor is now gradually increased from the initial setting by increasing the speed setting of the resistor 1P. This increases the potential across the output resistor RO1 of the follower A14—K14 and the corresponding potential impressed in the control circuit of the Error Signal Amplifier. The conductivity of the thyratrons T1 through T4 and the potential across the armature A is correspondingly increased, the increase being modified in accordance with the changing potential across the network N1. The magnitude to which the armature current increases is limited by the magnitude to which the potential drop across the output resistor RO1 of follower A14—K14 may be raised, and this is determined by the follower itself since the follower has a saturation characteristic. The potential drop across the output resistor RO1 of the follower eventually reaches a constant magnitude, and the increase of the armature potential above this magnitude is suppressed regardless of the setting of the speed-setting resistor 1P.

When the armature potential reaches a magnitude approaching rated potential, say at 85% of rated potential, the relay 5CR is actuated. The actuation of this relay connects the adjustable arm of the resistor 1P to the grid G13, and now the Motor is controlled by the follower A13—K13. The output resistor RO2 of this follower is connected to control thyratron T6 and thus the field current. As the potential across this output resistor RO2 increases by further increase in the speed setting, the field is weakened and the motor speed further increases. This increase continues until the Motor is operating at rated or the desired speed.

If during operation at maximum or high speed, at which the field would be at a minimum or low, the field strength is suddenly increased to the full magnitude, the Motor voltage would suddenly rise to a high magnitude, and if this condition continued for any appreciable time interval, the Motor would be damaged. To prevent damage to the Motor, the field snubbing relay 7CR is provided. This relay is actuated when the motor voltage reaches about 150% of rated voltage. At this point, the normally closed contact 163 of the relay is opened disconnecting the speed-setting resistor from the grid G13, and the normally open contact 167 is closed connecting the movable arm of the maximum speed resistor 3P to the grid G13. The field is now instantaneously reduced to its minimum strength. This in turn reduces the voltage across the armature A, and the relay 7R drops out again raising the voltage and repeating the above-described operation. The relay 7R thus flutters from its actuated to its unactuated condition until the speed of the armature A is reduced to that corresponding to the one setting.

When the speed setting 1P is reduced from a higher magnitude to a substantially lower magnitude, the Quick Slowdown Circuit comes into operation. On the reduction of the speed setting, the speed reference signal potential across the output resistor RO1 of the follower A14—K14 is substantially reduced. This potential is impressed in the input circuit of the Error Signal Amplifier and abruptly shifts the phase of the control potential of the thyratrons T1 to T4 so that the current through these thyratrons is reduced to a low magnitude. The potential across LS3 and LS4 then drops to a low magnitude. Since the Motor at this point continues to rotate at a high speed and its voltage is high, the counter electromotive force is substantially higher than the speed reference signal potential (RO1). Under such circumstances, thyratron AT3 is rendered conducting actuating relay 10CR. Since at this time the voltage across LS3 and LS4 is low, thyratron AT4 is also rendered conducting so that relay 12CR is actuated. The relay 12CR is so related to relay 10CR that the upper normally open contact 224 of relay 12CR closes before the normally closed contact 75 of relay 10CR in parallel with its opens. The opening of contact 75 then does not have any effect on the motor armature circuit since this contact is shunted by the normally open contact 224 of relay 12CR which was closed first. In addition, the normally open contact 83 of relay 10CR and the normally open contact 85 of relay 12CR are closed. This closes the circuit of coil 11CR actuating this relay and connecting the braking resistor RB across the armature A. The Motor is thus brought to a low speed in a relatively short time interval.

It may happen that because of the failure of the control the motor speed becomes excessive in spite of the setting of the control for the Motor. Such a situation could arise if the tube AT2 fails causing the error signal supplied by the Error Signal Amplifier to rise to the high magnitude of the positive conductor DL1. Under such circumstances, the Overspeed Protective Circuit comes into operation.

When the motor speed rises to an excessively high magnitude, the counter electromotive force of the Motor is high, and there is substantial potential between the conductors LS3 and LS4. The counter electromotive force is under such circumstances higher than the speed reference signal potential derivable from the output resistor RO1 of the follower A14—K14. Thyratron AT3 is then rendered conducting but thyratron AT4 fails to conduct. In this case, relay 10CR is actuated and relay 12CR remains unactuated. The upper normally closed contact 75 of relay 10CR then opens, opening the circuit through the coil of the contactor R and thus interrupting the supply of current to the armature from the Armature Power Supply Unit. Further, since the contactor R is now deenergized, its normally closed contact 41 in circuit with the coil of the relay 11CR is closed, and the relay is actuated to connect the braking resistor RB across the armature A. The Motor is then quickly brought to rest so that the repair in the control system may be effected.

SUMMARY

The invention disclosed above deals with a control system containing, among other features, the following principal unique features.

(1) A two-stage filter and phase shifter for supplying the field thyratron (T6) ripple control signal.

(2) A limiting cathode-follower circuit with a single speed resistor 1P and a maximum field volts adjustment (7P).

(3) Micro-jogging by means of a stand-by voltage (8P).

(4) Isolated maximum speed compensation (6P).

(5) An improved Quick Slowdown Circuit.

(6) An Overspeed Protective Circuit to shut down the drive in case an electronic tube (for example AT2 or VR2) fails.

These features are necessary to apply the control to machine tool feed drive applications where speed ranges are required and the motor has to deliver rated torque at speeds as low as 7½ r.p.m. The control has a counter electromotive force type regulator and control of the drive over the entire speed range is accomplished with a single potentiometer.

In the Armature Power Supply Unit, the value of the A.C. component or ripple applied to the thyratron grids (G1 through G4) is about 75 volts to obtain more exact control of the drive over the wide speed range.

Two voltage sensitive D.C. relay coils are connected across the armature, the coils of the full field relay (5CR) and the field snubbing relay (7CR). When the Motor is to be started with the speed potentiometer (1P) preset to a point in the field weakening region, it is desirable to keep the motor shunt field SU at full strength until the Motor has accelerated to nearly base speed. This is accomplished by the full field relay which is adjusted to pick up when the armature voltage reaches approximately 85% of rated value. Before 5CR has picked up, its contacts hold the Field Power Supply Unit at full output independent of the speed potentiometer (1P) setting. The field snubbing relay (7CR) is provided to limit the armature voltage when the Motor is being operated at maximum speed by field weakening and the shunt field is suddenly returned to full strength. The relay is adjusted to pick up at approximately 150% of rated motor volts. When the field snubbing relay picks up, its contacts switch the slider of the speed potentiometer to a weak field setting (3P). Thus, the relay will "flutter" to limit the armature voltage to a safe value.

An important novel feature resides in the control of the free wheeling thyratron T6 of the Feld Power Supply Unit. Formerly, the secondary winding of the control (ripple) transformer for the field control tube was in the grid lead and the primary of the transformer was across the teaser secondary (1ATS1) which is 90° out of phase with the anode voltage derived from the main secondary (1ATS2). The stability of the drive in the field region was not good with this circuit as the firing pips (commutation pips) of the armature thyratrons (T1 through T4) would be reflected back through transformer 1T and would appear on the A.C. component of the thyratron (T6) grid voltage. This was eliminated by connecting the primary (5TP) of the grid transformer 5T to the main secondary 1ATS2 and then using two RC sections N2 to phase shift the voltage 90° as well as filter it. The A.C. ripple component appearing across the resistor 153 is now completely free from any effects due to the operation of the armature thyratrons (T1—T4).

In the Armature Power Supply Unit because of the larger A.C. potential component on the armature thyratrons (T1—T4) and the regulation requirements at lower speeds, a two-stage D.C. amplifier (Error Signal Amplifier) is used to amplify the error signal. This amplifier is a resistor coupled amplifier with common cathode connection. A rate-of-change feed-back loop is used to make the amplifier less sensitive to ripple and to insure stability. Since the output of the amplifier has only one polarity, a separate bias is supplied across resistor B1 to put the amplifier in the operating region of the armature thyratrons (T1—T4).

Previous controls have used a single speed potentiometer on the cathode follower reference to control the operation of the drive over the armature region. For field control, the slider of the speed potentiometer was switched directly into the grid-to-cathode circuit of the field thyratrons. This meant that grid current from the field thyratrons would flow through a portion of the reference circuit when the switching operation occurred and resulted in a speed discontinuity. To overcome this objectionable feature, a new reference circuit is provided so that the switching operation can be performed without any effect on the motor speed. The new reference circuit of the armature voltage regulator has two cathode follower outputs (AT5). The one output is the reference voltage which is compared to a portion of the motor armature voltage (N1). The resulting difference in the two signals is the error voltage which is fed into the first stage (AT1) of the amplifier. The other output is the grid signal for the field thyratrons. Both of these signals are controlled by a single potentiometer (1P) in the following manner. As the slider on the speed potentiometer (1P) is moved in the increase direction, triode section A14—K14 conducts and the voltage increases across the cathode follower resistor. As this voltage goes up, the motor is being brought up to base speed by the increasing motor armature voltage. As the motor approaches rated armature voltage, the grid voltage on the triode section A14—K14 becomes almost equal to the plate voltage and the triode section begins to saturate. This saturation effectively limits the motor armature voltage from going any higher while the speed potentiometer 1P is working on the motor field. All the time that the speed potentiometer slider has been coming up through the armature voltage range, relay 5CR has held the field rectifiers at full field output. When 5CR picks up, it transfers the grid lead of triode section A13—K13 to the slider of the speed potentiometer 1P. This causes the latter triode section A13—K13 to start conducting at a point just below the voltage required to weaken the field thyratron (T6). Then, as the slider of the speed potentiometer increases further, the voltage across the resistor RO2 increases and starts weakening the shunt field on the motor as it goes on up to maximum speed. Another feature of the new reference circuit which makes use of the limiting action of the cathode follower tube AT5 is the maximum field volts potentiometer 7P. This potentiometer provides an adjustment to control the maximum amount of voltage allowed on the motor field before relay 5CR picks up.

Another problem encountered in machine tool applications is the micro-jogging feature. In the ordinary jogging action, the reference voltage is applied and the motor armature voltage builds up to the desired value. This would build up torque on the motor shaft until the static friction of the tool was overcome and then overshoot the desired setting of the tool because of the lower dynamic coefficient of friction. For micro-jogging, the driven gears or other mechanism must be hit short, sharp jarring blows by the output of the motor shaft to obtain the minute movements required. This momentary jar on the gears disrupts the static friction momentarily and allows the tool to move at a lower value of applied torque. To accomplish this, a stand-by potentiometer 8P is added to provide an adjustment so that the armature thyratrons (T1—T4) are delivering a low voltage to the armature circuit when the drive is at standstill. This permits the motor to run immediately after the armature contactor has been closed.

The armature current transformer 3T includes one secondary 3TS1 for IR compensation and another secondary winding 3TS2 to provide a maximum speed compensation circuit which is connected in series with the grid-to-cathode voltage of the field thyratron T6.

When the stop push button ST is pressed, the armature A is disconnected from the Armature Power Supply Unit and dynamic braking is applied to bring the Motor to a stop. However, the prior art drive does not provide retarding motor torque when a change from a high to a low speed setting is made without stopping the drive. This is true because the armature thyratrons (T1—T4) cannot pass reverse current. The Quick Slowdown Circuit is a relaying scheme which is provided to permit dynamic braking to a lower speed setting without stopping the drive. Prior art apparatus for quick slowdown used the apparatus current signal for an input voltage, but this resulted in excess chattering and did not give as good operational results as desired. In the Circuit of this invention, a D.C. voltage which consists of three voltage signals in series is connected to the control circuit (grid to cathode) of thyratron AT3. These three signals are (1) the portion of the armature current voltage signal appearing across the upper portion of resistor 5P, (2) the speed regulating signal to the input of the amplifier circuit which appears between the arm of resistor 5P and ground conductor LG, (3) the fixed D.C. voltage across the resistor 117. The polarity of these voltages is such that thyratron AT3 is biased beyond cutoff when the drive is running at a constant speed or is at a standstill. Thyratron AT3 does not fire until the current from the Armature Supply has dropped to zero, and the armature voltage and speed exceeds the value called for by the setting of the speed potentiometer P1. Both of these conditions occur when the speed potentiometer is rapidly turned to a lower speed setting while the drive is running. The firing of thyratron AT3 energizes the relay 10CR and a make contact 83 from 10CR energizes the dynamic braking relay 11CR. As the motor speed approaches the new setting of the speed potentiometer P1, thyratron AT3 stops conducting and the dynamic braking is removed. The quick slowdown feature may be omitted by simply removing the thyratron AT3 from its socket.

Should a failure, such as that of the AT1 or VR2 in the Amplifier occur, the speed of the drive would increase and probably do a great deal of damage to the workpiece and the machine tool. To prevent this, an Overspeed Protective Circuit is provided; it operates in conjunction with the Quick Slowdown Circuit. The elements of the Overspeed Circuit are similar to those in the Quick Slowdown Circuit. The armature current signal between LS3 and LS4 is used for the grid-to-cathode signal on the thyratron AT4 in the Overespeed Circuit. With lead LS4 connected to the grid G12, the only time thyratron AT4 conducts is when the armature current signal is almost zero. As the armature current signal increases, the grid is driven further negative. On quick slowdown, the system operates in the following manner. When the speed potentiometer (P1) setting is suddenly reduced, the Quick Slowdown Circuit operates as previously explained and energizes relay 10CR. This closes contact 83 in series with the dynamic braking contactor coil of (11CR) and opens contact 75 in series with the Stop push button ST. At the same time, the Overspeed Circuit operates and energizes relay 12CR which closes contact 85 in series with the dynamic braking contactor coil of (11CR) and contact 224 in parallel with contact 75. The time delays of the two circuits have been selected so that the 12CR contact 224 in series with the Stop push button ST can close before the 10CR contact 75 opens. This enables the quick slowdown function to operate without stopping the drive. When tube AT2 in the Amplifier fails, the grids of the armature thyratrons (T1—T4) are driven positive, which increases the armature voltage and causes the motor speed to increase. The Overspeed Circuit, in conjunction with the Quick Slowdown Circuit, limits the speed increase in the following manner. The rise in armature voltage produces an increase in the counter electromotive force voltage which causes the Quick Slowdown Circuit to operate. At the same time, the accelerating current, due to the increase in motor speed, cuts off thyratron AT4 and prevents relay 12CR from operating. Therefore, with contacts 75 and 224 both open, the armature contactor F or R drops out and dynamic braking is applied to bring the Motor to a stop. While the Overspeed Circuit is mainly concerner with the failure of the Amplifier tubes, it aids in protecting the drive from running away due to the failure of any of the control tubes except the AT3 in the Quick Slowdown Circuit. Either the Overspeed Circuit will shut down the drive on a tube failure or the tube itself is inherently fail-safe and its failure merely causes the drive to drift to a stop.

While a preferred embodiment of this invention has been disclosed herein, many modifications thereof are feasible. The invention, therefore, is not to be restricted except insofar as is necessitated by the spirit of the prior art.

We claim as our invention:

1. Apparatus for controlling the operation of a motor having an armature and a field winding comprising in combination, armature power supply means connected to said armature, field power supply means connected to said field, manually actuable means connected to said field supply means for varying the power supplied to said field, means adapted to be connected to said field supply means but normally disconnected therefrom when connected to said field supply means operative to set said field at relatively low excitation, and means responsive to said armature when the voltage thereof is substantially higher than rated voltage for disconnecting said manually actuable means from said field supply means and connecting thereto said means operative to set said field at low excitation.

2. Apparatus for controlling the operation of a motor supplied with current from a three-phase source, said motor having an armature and a field winding, comprising in combination a Scott connected transformer having a primary including windings connected in quadrature to said source ad a quadrature secondary, a main secondary winding and a teaser secondary winding connected to the quadrature windings respectively of said binary, armature power supply means connected to said quadrature secondary and to said armature for supplying power thereto, said armature supply means producing potentials of abrupt wave front during operation, an electric discharge device having an anode, a cathode and a control electrode, means connecting said anode and cathode between said main secondary winding and said field winding so that current is supplied from said main secondary winding to said field winding through said anode and cathode, and means coupled between said main winding and said control electrode and cathode for impressing a potential ripple between said control electrode and cathode, said coupled means including phase shift means for shifting the phase of said ripple with respect to the potential of said main winding and filter means for suppressing the disturbances produced by the reflection through said transformer of said potentials of abrupt wave front produced in said armature power supply means.

3. Apparatus for controlling the operation of a motor supplied with current from a three-phase source, said motor having an armature and a field winding, comprising in combination a transformer having a primary connected to said source and a secondary, armature power supply means connected to said secondary and to said armature for supplying power thereto, said armature supply means producing potentials of abrupt wave front during operation, an electric discharge device having an anode, a cathode and a control electrode, means connecting said anode and cathode between said primary and said field winding so that current is supplied from said transformer to said field winding through said anode and cathode, and means coupled between said transformer and said control electrode and cathode for impressing a potential ripple between said control electrode and cathode, said coupled means including phase shift means for shifting the phase of said ripple with respect to the potential of said transformer and filter means for suppressing the disturbances produced by the reflection through said transformer of said potentials of abrupt wave front produced in said armature power supply means.

4. Apparatus for controlling the operation of a motor supplied with current from an alternating current source, said motor having an armature, comprising in combination at least one electric discharge device having an anode, a cathode and a control electrode, current transformer means having primary means and secondary means, means including said current transformer means and said anode and cathode connecting said armature to said source, means connected to said secondary means for deriving a direct current signal from said secondary means dependent on the current flowing through said primary means, a plural stage amplifier having an input circuit and an output circuit and including rate-of-change negative feed-back means between said output circuit and said input circuit, means connected to said deriving means and said input circuit for impressing said signal in said input circuit, alternating-current potential component producing means, and means including said component producing means connecting said output circuit between said control electrode and cathode so as to introduce potential between said control electrode and said cathode to effect compensation for changes in the current flowing through said primary, said component producing means producing a component of substantial magnitude compared to said signal.

5. Apparatus for controlling the operation of a motor having an armature and a field winding comprising in combination armature power supply means connected to said armature, field power supply means connected to said field, manual speed control means, a first cathode follower having an input circuit and an output circuit, a second cathode follower having an input circuit and an output circuit, means connecting said speed control means to said input circuit of said first follower to control the output thereof, means connecting said speed control means to said input circuit of said second follower to control the output thereof, means connecting the output circuit of said first follower to said armature supply means to control the power supplied thereby, and means connecting the output circuit of the second cathode follower to said field supply means to control the output thereof.

6. Apparatus for controlling the operation of a motor having an armature and a field winding comprising in combination armature power supply means connected to said armature, field power supply means connected to said field, manual speed control means, a first cathode follower having an input circuit and an output circuit, a second cathode follower having an input circuit and an output circuit, means for selectively connecting said speed control means to said input circuits to control selectively the outputs of said followers, means connecting the output circuit of said first follower to said armature supply means to control the power supplied thereby, and means connecting the output circuit of the second cathode follower to said field supply means to control the output thereof.

7. Apparatus for controlling the operation of a motor having an armature and a field winding comprising in combination armature power supply means connected to said armature, field power supply means connected to said field, manual speed control means, a first cathode follower having an input circuit and an output circuit, a second cathode follower having an input circuit and an output circuit, means for selectively connecting said speed control means to said input circuits to control selectively the outputs of said followers, means connecting the output circuit of said first follower to said armature supply means to control the power supplied thereby, and means connecting the output circuit of the second cathode follower to said field supply means to control the output thereof, said selective connecting means including means responsive to the potential across said armature for controlling the selectivity thereof.

8. Apparatus for controlling the operation of a motor having an armature comprising in combination armature power supply means including means for varying the supply of current to said armature, a dynamic braking means disconnected from said armature in the normal running condition of said motor but adapted to be connected to said armature, means connected to said supply means for deriving a potential dependent on the current conducted by said armature, speed signaling means connected to said varying means for impressing thereon a signal potential to set the current to be supplied to said armature by said supply means and the speed of said armature, and means connected to said supply means and responsive to the algebraic sum of said dependent potential and said signal potential for connecting said braking means to said armature only when the current conducted by said armature is substantially zero and simultaneously the signal potential is at a magnitude substantially lower than that corresponding to the speed of said armature.

9. Apparatus for controlling the operation of a motor having an armature, comprising in combination armature power supply means, dynamic braking means, means to be actuated for connecting said braking means to said armature, means connected to said supply means for deriving a first potential dependent on the current conducted by said armature, means connected to said armature for deriving a second potential dependent on the potential across said armature, means for deriving a third potential substantially equal to the algebraic difference between said first and second potentials, means for deriving a speed reference signal potential, and means connected to said supply means and responsive to the algebraic difference of said third potential and said reference potential for actuating said actuable means to connect said braking means to said armature when the current conducted by said armature is substantially zero and simultaneously the reference potential is at a magnitude substantially lower than that corresponding to the speed of said armature and for interrupting the supply of power to said armature by said supply means and actuating said actuable means to connect said braking means to said armature when the current conducted by said armature is substantial but said second potential is substantially higher than said reference potential.

10. Apparatus for controlling the operation of a motor having an armature, comprising in combination armature power supply means, dynamic braking means, means to be actuated for connecting said braking means to said armature, means connected to said supply means for deriving a first potential dependent on the current conducted by said armature, means connected to said armature for deriving a second potential dependent on the potential across said armature, means for deriving a third potential substantially equal to the algebraic difference between said first and second potentials, means for deriving a speed reference signal potential, a first electric discharge device, a second electric discharge device, each said device having an anode, a cathode, and a control electrode, means connected between the control electrode and cathode of said first device for impressing in series between said control electrode and cathode said third potential, said reference potential, and a biasing potential, said potentials being so related that said first device is rendered conducting only either when said armature-current potential is substantially zero and said third potential is appreciable or when said armature-current dependent potential is substantial and said third potential is substantially higher than said reference potential, means connecting said control electrode and cathode of said second device to said deriving means for impressing said first potential between said last-named control electrode and cathode so that said second device is conducting when said armature current dependent potential is substantially zero, and means connecting said discharge devices to said supply means and said actuable means so that the supply of power by said supply means to said armature is interrupted and said actuable means is actuated to connect said brake means to said armature when only said first device is conducting and only said actuable means is actuated as aforesaid when both said devices are conducting.

11. Apparatus for controlling the operation of a motor having an armature, comprising in combination armature power supply means, dynamic braking means, means to be actuated for connecting said braking means to said armature, means connected to said supply means and to said armature for deriving a potential dependent on the counter electromotive force of said armature, means for deriving a speed reference signal, and means connected to said supply means and responsive to the algebraic difference of said dependent potential and said reference potential for actuating said actuable means to connect said braking means to said armature when said dependent potential is substantially higher than said reference potential.

12. Apparatus for controlling the operation of a motor having an armature, comprising in combination armature power supply means, dynamic braking means, means to be actuated for connecting said braking means to said armature, means connected to said supply means for deriving a first potential dependent on the current conducted by said armature, means connected to said first potential deriving means and to said armature for deriving a second potential substantially dependent in the counter electromotive force across said armature, means for deriving a speed reference signal, means connected to said actuable means and to said first, second and reference potential deriving means and responsive to the algebraic difference between said reference potential and said second potential and to said first potential for actuating said actuable means only when said second potential is substantially higher than said reference potential and said first potential is substantially zero and for interrupting the supply of power by said supply means and actuating said actuable means when said second potential is substantially higher than said reference potential and said first potential is of appreciable magnitude.

13. In combination a motor having an armature, power supply means connected to said armature for supplying power thereto, braking means, means actuable to connect said braking means to said armature and disconnecting said braking means from said armature, a first electric discharge device having principal electrodes and a control electrode, a second electric discharge device having principal electrodes and a control electrode, means connected to the principal electrodes of said discharge devices, to said actuable means and to said supply means for actuating said actuable means only to connect said braking means to said armature when both said devices are conducting and both to interrupt the supply of power by said supply means and actuate said actuable means to connect said braking means to said armature when only said first device is conducting, and means connected to said control electrodes for rendering said devices conducting selectively.

14. In combination a motor having an armature, power supply means connected to said armature for supplying power thereto, braking means, means actuable to connect said braking means to said armature and disconnecting said braking means from said armature, means for deriving a speed reference potential, a first electric discharge device having principal electrodes and a control electrode, a second electric discharge device having principal electrodes and a control electrode, means connected to the principal electrodes of said discharge devices, to said actuable means and to said supply means for actuating said actuable means only to connect said braking means to said armature when both said devices are conducting and both to interrupt the supply of power by said supply means and actuate said actuable means to connect said braking means to said armature when only said first device is conducting, and means connected to said control electrodes, to said deriving means and to said armature for rendering said devices conducting selectively depending on the relationship between said reference potential and the counter electromotive force of said armature.

15. Apparatus for controlling the operation of a motor having an armature comprising in combination armature power supply means connected to said armature to supply current thereto, regulating means connected to and cooperative with said supply means and responsive to the current through said armature to regulate the current supplied to said armature, the response of said regulating means having a low time constant, and speed-setting means connected to said regulating means for impressing a signal on said regulating means for setting the speed of said armature, said speed setting means including means causing said impressed signal to be built up gradually over a substantially higher interval than the time constant of response of said regulator.

16. Apparatus for controlling the operation of a motor having an armature comprising in combination armature power supply means connected to said armature to supply alternating current thereto, regulating means connected to and cooperative with said supply means and responsive to the current through said armature to regulate the current supplied to said armature, the response of said regulating means having a low time constant of the order of less than a period of said alternating current, and speed-setting means connected to said regulating means for impressing a signal on said regulating means for setting the speed of said armature, said speed-setting means including means causing said impressed signal to be built up gradually over a substantially higher interval through the time constant of response of said regulator, said higher interval being of the order of about 10 to 20 periods of said alternating current.

17. In combination an electric discharge device having an anode, a cathode and a control electrode, output impedance means connected in series with said anode and cathode, first potential impressing means, second potential impressing means, a capacitor, a grid resistor, normally closed switch means, normally open switch means, means connecting said capacitor between said control electrode and said cathode, means including said normally closed means connecting said grid resistor and said first impressing means in parallel with said capacitor with said grid resistor electrically nearer said control electrode than said cathode, means including said normally open switch means for connecting said second impressing means in parallel with said first impressing means, and means for substantially simultaneously opening said normally closed switch means and closing said normally open switch means.

18. Apparatus for controlling the operation of a motor supplied with current from a three-phase source, said motor having an armature and a field winding, comprising in combination a Scott connected transformer having a primary including windings connected in quadrature to said source and a quadrature secondary, a main secondary winding and a teaser secondary winding connected to the quadrature windings respectively of said primary, armature power supply means connected to said quadrature secondary and to said armature for supplying power thereto, said armature supply means producing potentials of abrupt wave front during operation, an electric discharge device having an anode, a cathode, and a control electrode, means connecting said anode and cathode between said main secondary winding and said field winding so that current is supplied from said main secondary winding to said field winding through said anode and cathode, and means coupled between said main winding and said control electrode and cathode for impressing a potential ripple between said control electrode and cathode, said coupled means including integrated into a single network phase shift means for shifting the phase of said ripple with respect to the potential of said main winding and filter means for suppressing the disturbances produced by the reflection through said transformer of said potentials of abrupt wave front produced in said armature power supply means.

19. Apparatus for controlling the operation of a motor having an armature comprising in combination armature power supply means including means for varying the supply of current to said armature, a dynamic braking means disconnected from said armature in the normal running condition of said motor but adapted to be connected to said armature, means connected to supply means for deriving a potential dependent on the current conducted by said armature, speed signaling means connected to said varying means for impressing thereon a signal potential to set the current to be supplied to said armature by said supply means and the speed of said armature, an electric discharge device having an anode, a cathode and a control electrode, means connecting in series between said control electrode and said cathode, said armature current dependent potential, said speed-signal potential and a biasing potential, said last-named potentials being so related that said device is non-conducting when said dependent potential and said signal potential are both substantially zero but is conducting when said dependent potential is substantially zero but said signal potential is at a magnitude corresponding to appreciable speed of said armature, and means connected to said anode and cathode and said supply means for connecting said braking means to said armature only when the current conducted by said armature is substantially zero and simultaneously the signal potential is at a magnitude substantially lower than that corresponding to the speed of said armature.

20. Apparatus for controlling the operation of a motor supplied with current from an alternating current source, said motor having an armature, comprising in combination at least one electric discharge device having an anode, a cathode and a control electrode, current transformer means having primary means and secondary means, means including said current transformer means and said anode and cathode connecting said armature to said source, means connected to said secondary means for deriving a direct current signal from said secondary means dependent on the current flowing through said primary means, said deriving means including rate-of-change means responsive only to an increase in the current flowing through said primary means of said current transformer means to produce a change in the potential derivable from said deriving means, a plural stage amplifier having an input circuit and an output circuit and including rate-of-change negative feed-back means between said output circuit and said input circuit means connected to said deriving means and said input circuit for impressing said signal in said input circuit, the change produced by said input circuit as to suppress a correcting change in the current supplied to said armature, alternating-current potential component producing means, and means including said component producing means connecting said output circuit between said control electrode and cathode so as to introduce potential between said control electrode and said cathode to effect compensation for changes in the current flowing through said primary, said component producing means producing a component of substantial magnitude compared to said signal.

21. Apparatus for controlling the operation of a motor having an armature and a field winding comprising in combination armature power supply means connected to said armature, field power supply means connected to said field winding, means connected to said armature supply means and to said field supply means for varying the power supplied by said armature supply means to said armature and by said field supply means to said field, said varying means having a unitary variable impedance component common to said armature supply means and to said field supply means, the impedance of said component in all settings being the same for the armature supply means and for the field supply means, said component when set to increase or decrease the speed of said motor being adapted to increase or decrease the power supplied to said armature, and at the same setting to decrease or increase respectively the power supplied to said field, and means responsive to the voltage across said armature and connected to said varying means for preventing said varying means from decreasing the power supplied to said field as aforesaid until said armature voltage reaches a predetermined magnitude.

22. Apparatus for controlling the operation of a motor having an armature and a field winding comprising in combination armature power supply means connected to said armature, field power supply means connected to said field winding, means connected to said armature supply means and to said field supply means for varying the power supplied by said armature supply means to said armature and by said field supply means to said field, said varying means having a unitary variable impedance component common to said field supply means and to said armature supply means, the impedance of said component in all settings being the same for the armature supply means and for the field supply means, said component when set to increase or decrease the speed of said motor being adapted at the same setting to increase or decrease the power supplied to said armature and to decrease or increase respectively the power supplied to said field, and said varying means including means connected to said armature power supply means for preventing the power supplied to said armature power supply means for preventing the power supplied to said armature from exceeding a predetermined magnitude corresponding to a predetermined setting of said component as said varying means increases the speed of said motor and in so increasing said speed changes the setting of said component in a sense in which the power supplied to said armature would tend to increase, and means responsive to the voltage across said armature and connected to said varying means for preventing said varying means from decreasing the power supplied to said field as aforesaid until said armature voltage reaches a predetermined magnitude.

23. Apparatus for controlling the operation of a motor having an armature and a field winding comprising in combination armature power supply means connected to said armature, field power supply means connected to said field winding, a first cathode follower circuit having a control electrode and first output impedance means, a second cathode follower circuit having a control electrode and second output impedance means, variable voltage supply means, means connecting said first output impedance means to said armature supply means to control the output of said armature supply means in accordance with the current conducted by said first impedance means, means connecting said second impedance means to said field supply means to control the output of said field supply means in accordance with the current conducted by said second impedance means, an increase or decrease in the current conducted by said first impedance means causing an increase or decrease respectively in the supply of power to said armature and an increase or decrease in the current conducted by said second impedance means causing a decrease or increase respectively in the current supplied to the field winding, means connecting said variable supply means only to said control electrode of said first follower in the starting condition of said apparatus whereby the output of said first follower is varied in accordance with the variation of said variable supply means while the output of said second follower remains substantially constant, and armature voltage responsive means connected to said supply means for connecting said voltage supply means to said control electrode of said second follower when said armature voltage reaches a predetermined magnitude whereby the output of said second follower is varied by said variable voltage supply means after said armature voltage reaches said magnitude, said voltage supply means also remaining connected to said control electrode of said first follower while said voltage supply means is so connected to said control electrode of said second follower.

24. In combination a first cathode follower having a control electrode and first output impedance means, a second cathode follower having a control electrode and second output impedance means, control means, means normally connecting said control means only to said control electrode of said first follower to control the current conducted by said first impedance means while the current conducted by said second impedance means remains constant, first controllable means connected to said first impedance means responsive to the current conducted by said first impedance means and having an operation dependent on said last-named current, means connected to said controllable means and actuable by said controllable means when said controllable means has a predetermined operation for connecting said control means to the control electrode of said second follower to control the current conducted by said second impedance means, said control means also remaining connected to said control electrode of said first follower while said control means is so connected to said control electrode of said second follower, and second controllable means connected to said second impedance means responsive to the current conducted thereby and having an operation dependent on said last-named current.

25. Apparatus for micro-jogging a machine tool or the like while said machine tool is in its standby condition, comprising a motor having an armature, means connecting said armature in driving relationship with said tool, and an armature-supply circuit connected in power-supply relationship with said armature, said circuit being open in the standby condition of said tool, and said circuit including means to be actuated for closing said circuit, and said circuit also including first adjustable means connected to said closing means for conditioning said circuit to supply a first selected current to said armature, and second adjustable means connected to said closing means for conditioning said circuit to supply a second selected current to said armature, and connections between said first and second adjustable means connected to said closing means and actuable on the actuation of said closing means to supply to said armature initially said first selected current and automatically after said circuit has been closed for a predetermined short interval said second selected currents.

26. Apparatus for micro-jogging a machine tool or the like while said machine tool is in its standby condition, comprising a motor having an armature, means connecting said armature in driving relationship with said tool, and an armature-supply circuit connected in power-supply relationship with said armature, said circuit being open in the standby condition of said tool, and said circuit including means to be actuated for closing said circuit, and said circuit also including first adjustable means connected to said closing means for conditioning said circuit to supply a first selected current to said armature, and second adjustable means connected to said closing means for conditioning said circuit to supply a second selected current to said armature, and a network between said first and second adjustable means and connected to said closing means actuable on the actuation of said closing means to cause a continuous transition in a short predetermined interval from control of said armature by said first adjustable means to control of said armature by said second adjustable means thereby, to supply to said armature initially said first selected current and automatically after said circuit has been closed for said predetermined short interval said second selected currents.

References Cited in the file of this patent
UNITED STATES PATENTS

| 2,629,850 | McLane | Feb. 24, 1953 |
| 2,769,130 | Few | Oct. 30, 1956 |
| 2,802,977 | Harvey et al. | Oct. 13, 1957 |

OTHER REFERENCES

Langsdorf, A. S.: "Principles of Direct-Current Machines," 3d edition, 1923, published by McGraw-Hill Book Co., Inc., New York, pages 248–249.

General Electric Review Magazine, April 1943, pages 225–230.

Electronics Magazine, March 1952, pages 110–115.